Figure 1:
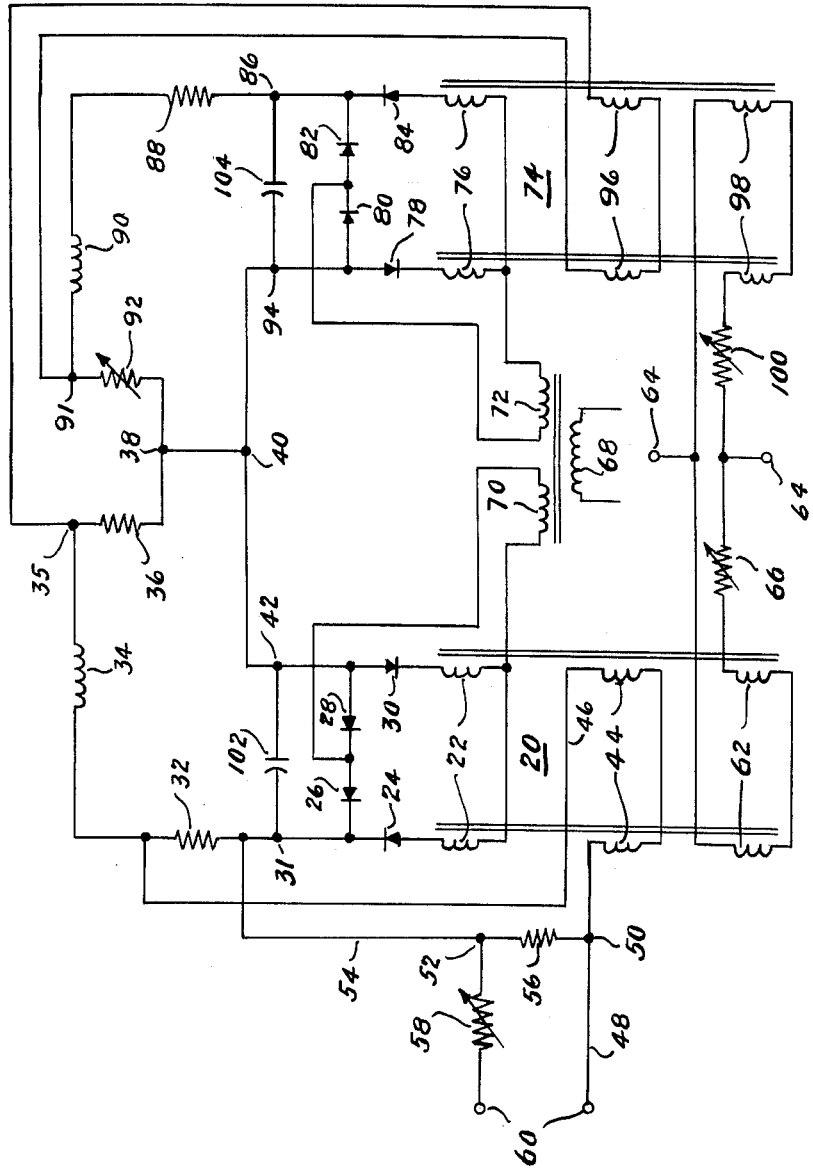

INVENTOR.
THOMAS J. FRANZ, JR.
BY Rey Eilers
ATT'Y.

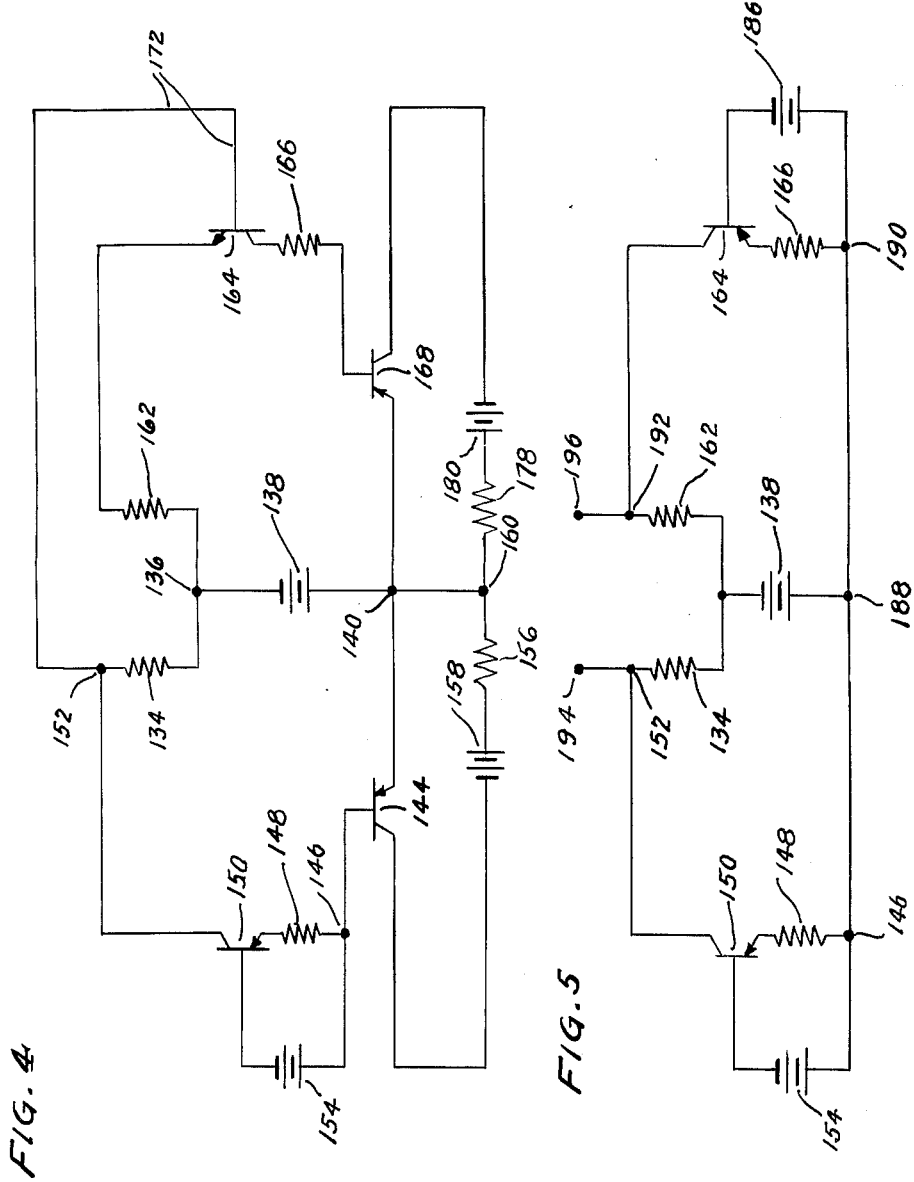

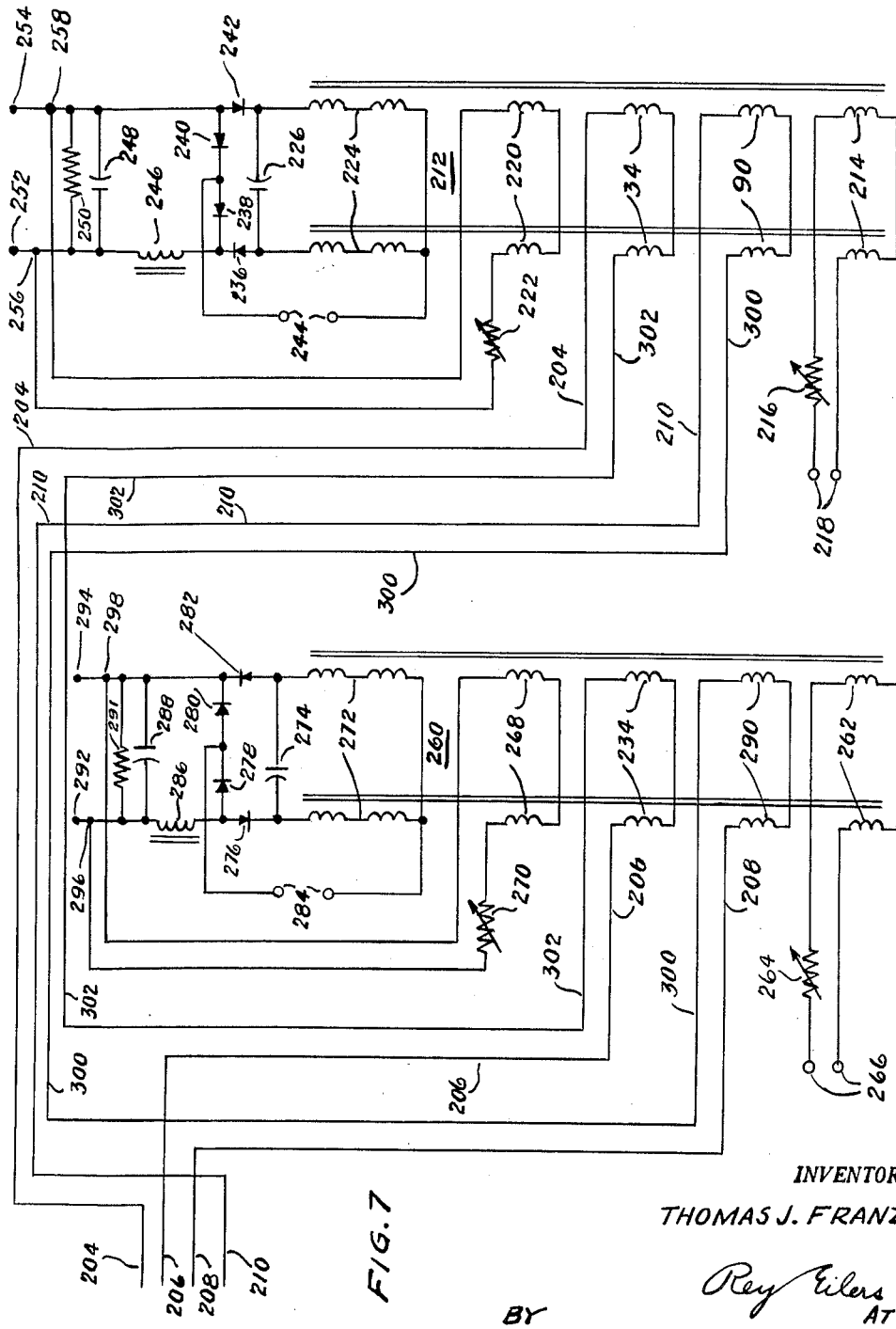

— # United States Patent Office 3,227,943
Patented Jan. 4, 1966

3,227,943
CONTROL SYSTEMS EMPLOYING A CONSTANT CURRENT SOURCE AND VARIABLE IMPEDANCE MEANS THAT PRODUCE CONTROL SIGNALS FOR A MAGNETIC AMPLIFIER
Thomas J. Franz, Jr., St. Louis County, Mo., assignor to Sperry Rand Corporation, a corporation of Delaware
Filed Nov. 21, 1960, Ser. No. 70,593
32 Claims. (Cl. 323—66)

This invention relates to improvements in control systems. More particularly, this invention relates to improvements in control systems which utilize comparator circuits.

It is therefore an object of the present invention to provide an improved control system which utilizes comparator circuits.

It is frequently desirable to determine the changes in impedance of a variable impedance element and to use such changes to actuate indicating or controlling devices. For example, it is frequently desirable to determine the changes in resistance of a resistance thermometer and to use such changes to actuate an indicating or controlling device. Similarly, it is frequently desirable to determine the changes in resistance of a strain gauge and to use such changes to actuate an indicating or controlling device. Also, it is frequently desirable to determine the changes in inductance of a magnetic pressure transducer and to use such changes to actuate an indicating or controlling device. In addition it is frequently desirable to determine the changes in capacitance of a capacitive pressure transducer and to use such changes to actuate an indicating or controlling device. In recognition of this fact, control systems have been proposed which utilized Wheatstone bridges and which employed resistance thermometers, strain gauges, magnetic pressure transducers, capacitive pressure transducers, or other variable impedances as the variable impedance legs of those bridges. Such control systems are operable, but they can not provide a high degree of accuracy, because Wheatstone bridges are inherently non-linear when those bridges are unbalanced. Further, the accuracy of a control system utilizing a Wheatstone bridge falls off sharply when that bridge is required to supply a current signal which is proportional to changes in the impedance of a variable impedance element. It would be desirable to provide a control system which determines changes in impedance of a variable impedance element and which uses such changes in impedance to actuate an indicating or controlling device but which does not use a Wheatstone bridge. The present invention provides such a control system; and it is therefore an object of the present invention to provide a control system which determines changes in impedance of a variable impedance element and which uses such changes in impedance to actuate an indicating or controlling device but which does not use a Wheatstone bridge.

One of the preferred forms of control system provided by the present invention utilizes two closed-loop amplifiers and connects the variable impedance element in the output circuit of one of those amplifiers. That form of control system makes it possible for changes in the impedance of that variable impedance element to produce an unbalance between the output circuits of the two amplifiers which is proportional to the change in impedance of the variable impedance element; and that unbalance can be used to effect actuation of an indicating or controlling device. The two amplifiers thus coact to actuate an indicating or controlling device by providing an unbalance which is proportional to the change in impedance of the variable impedance element, and they do so with a high degree of accuracy. Further, those amplifiers co-act to actuate that indicating or controlling device with a high degree of accuracy even when the change in impedance is substantial. It is therefore an object of the present invention to provide a control system which utilizes two closed-loop amplifiers and connects a variable impedance element in the circuit of one of those amplifiers.

In one embodiment of the present invention, the control system utilizes two magnetic amplifiers to provide a current output which is proportional to the change in impedance of a variable impedance element. Those magnetic amplifiers will preferably be identical; and one of those amplifiers will be connected to provide a constant current with a changing load while the other amplifier will be connected to provide a changing current with a constant load. The changing load will be a variable impedance element whose changes in impedance are to be determined; and the changing current in the other amplifier can be used to help actuate an indicating or controlling device. It is therefore an object of the present invention to provide a control system which utilizes two magnetic amplifiers to provide a current output which is proportional to the change in impedance of a variable impedance element.

In another embodiment of the present invention, the control system utilizes two magnetic amplifiers to provide a voltage output which is proportional to the change in impedance of a variable impedance element. Those magnetic amplifiers will preferably be identical; and one of those amplifiers will be connected to provide a constant current with a changing load while the other amplifier will be connected to provide a constant current with a constant load. The changing load will be a variable impedance element whose changes in impedance are to be determined; and the difference between the voltage drops across the changing and constant loads will be a voltage which is proportional to the changes in impedance of the variable impedance element. It is therefore an object of the present invention to provide a control system which utilizes two magnetic amplifiers to provide a voltage output which is proportional to the change in impedance of a variable impedance element.

In some other embodiments of the present invention, the control systems utilize transistor amplifiers to enable those control systems to provide outputs which are proportional to the changes in impedance of variable impedance elements. In each of those control systems, one of the transistor amplifiers provides a constant current with changing load while the other transistor amplifier helps provide a variable output which can be used to help actuate an indicating or controlling device.

In the operation of indicating and controlling devices, it is frequently desirable to have a wide range indicating or controlling device and also to have a narrow range indicating or controlling device. The present invention facilitates the provision of both wide and narrow range indicating or controlling devices by connecting the control windings of two different magnetic amplifiers into the output circuit of one of the amplifiers used in the control system. The control windings of the wide range magnetic amplifier will be wound so the ampere-turns needed to establish the desired null point for the magnetic amplifier will be attained at one value of current in the output circuit of the said one amplifier; and the control windings of the narrow range magnetic amplifier will be wound so the ampere-turns needed to establish the desired null point for that magnetic amplifier will be attained at a different value of current in the output circuit of the said one amplifier. As a result, the control system enables the narrow range magnetic amplifier to have a null point which is different from the null point of the wide range magnetic amplifier.

Other and further objects and advantages of the present invention should become apparent from an examination of the drawing and accompanying description.

In the drawing and accompanying description several preferred embodiments of the present invention are shown and described, but it is to be understood that the drawing and accompanying description are for the purpose of illustration only and do not limit the invention and that the invention will be defined by the appended claims.

Figure 2:
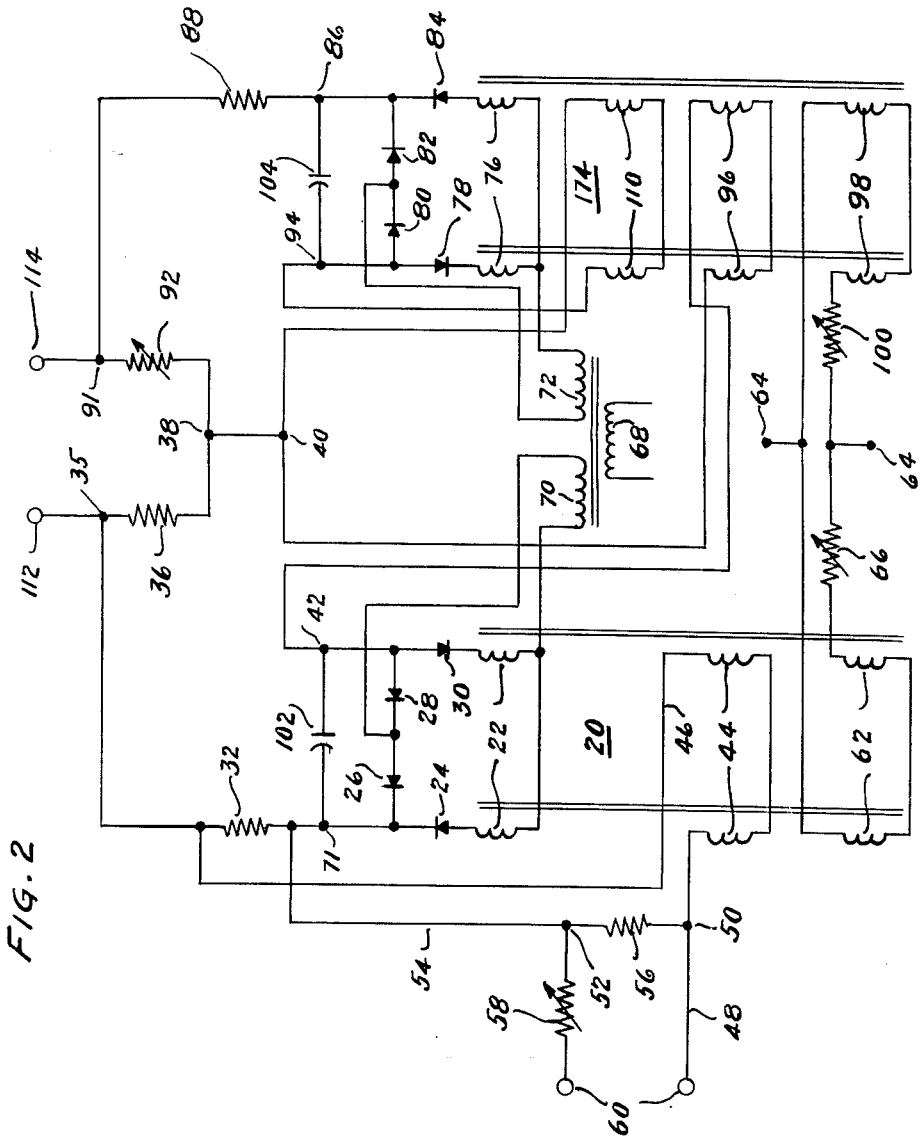
Figure 3:
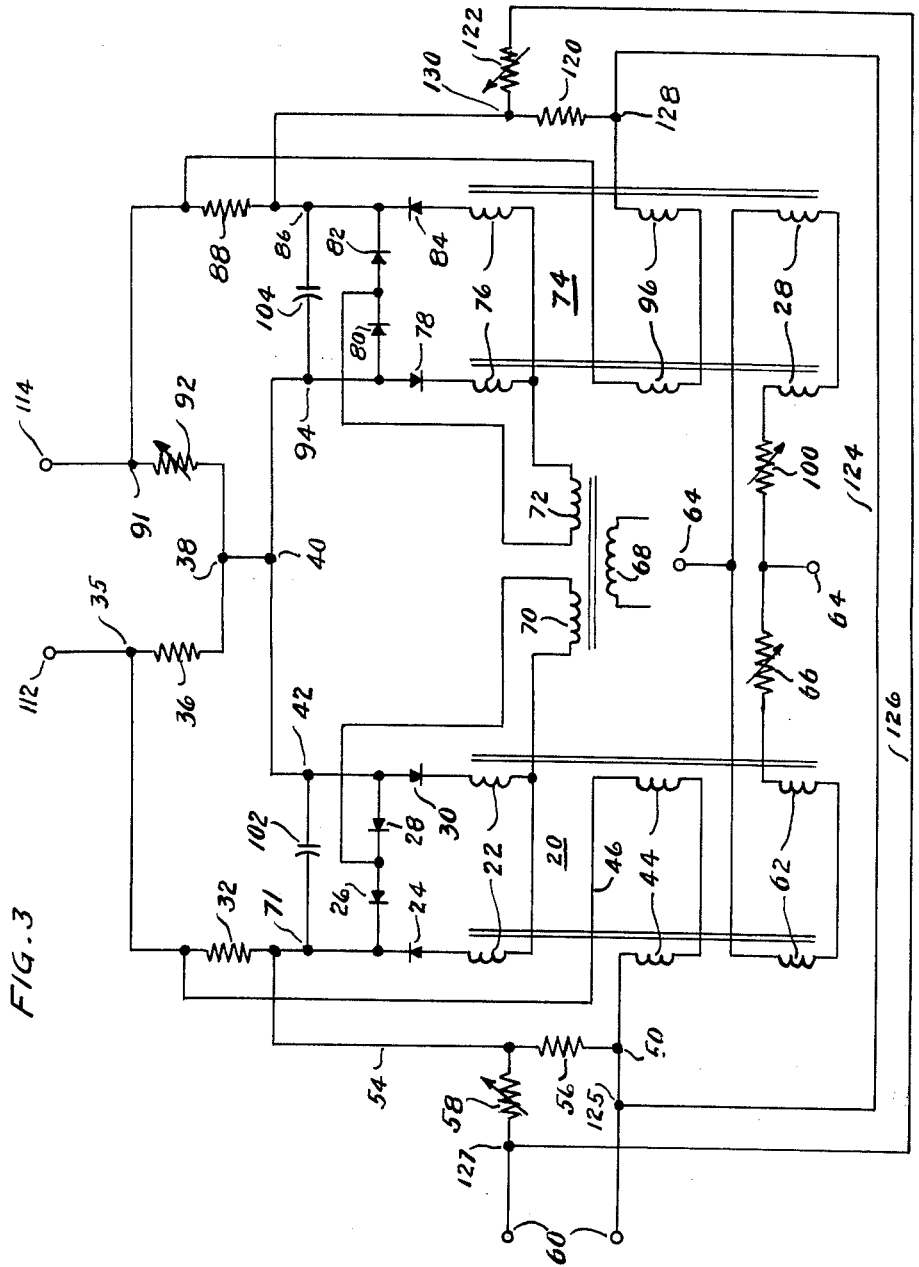
Figure 6:
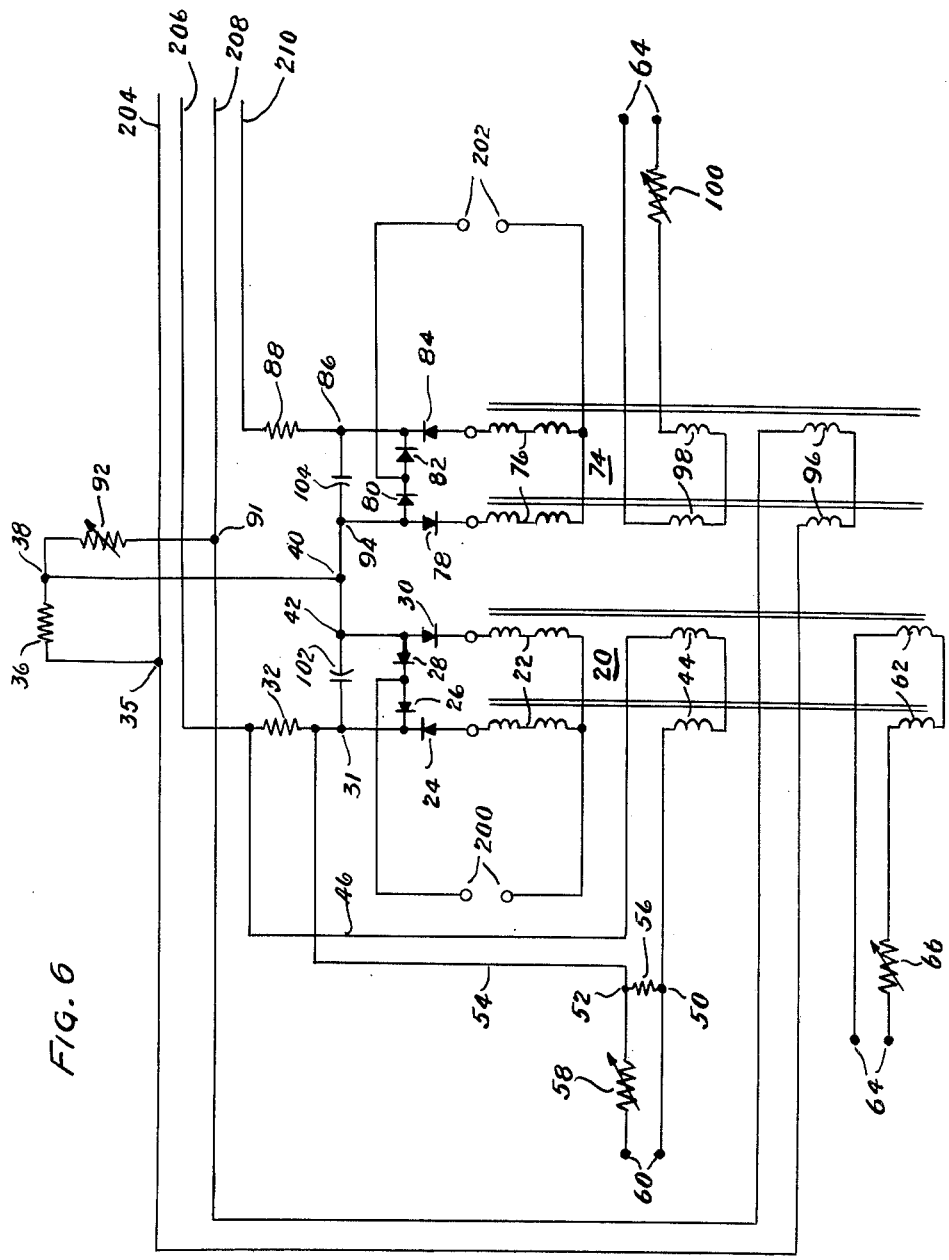

In the drawing:

FIG. 1 is a schematic diagram of one form of control system that is made in accordance with the principles and teachings of the present invention, FIG. 2 is a schematic diagram of another form of control system that is made in accordance with the principles and teachings of the present invention, FIG. 3 is a schematic diagram of a form of control system that is similar to the form of control system shown in FIG. 2, FIG. 4 is a schematic diagram of a control system that is made in accordance with the principles and teachings of the present invention and that uses transistors, FIG. 5 is a schematic diagram of a form of control system that is similar to the form of control system shown in FIG. 4, FIG. 6 is a detailed diagram of still another form of control system that is made in accordance with the principles and teachings of the present invention, and FIG. 7 is a detailed diagram of amplifiers used with the control system shown in FIG. 6.

Referring to the drawing in detail, the numeral 20 generally denotes a D.C. output, D.C. control, single phase, single-ended type, magnetic amplifier. That magnetic amplifier has an output winding 22, and the two sections of that winding are part of a rectifier bridge which include the diodes 24, 26, 28 and 30. A junction 31 connects the junction between diodes 24 and 26 with the bottom terminal of a resistor 32. The left-hand terminal of a control winding 34 of a controlled magnetic amplifier, not shown, which can be connected to an indicating or controlling device, is connected to the top terminal of the resistor 32. The right-hand terminal of the control winding 34 is connected to a junction 35 adjacent the top terminal of a variable impedance element 36. Junctions 38, 40 and 42 connect the bottom terminal of the variable impedance element 36 to the junction between the diodes 28 and 30.

The numeral 44 denotes the feedback winding of the magnetc amplifier 20; and a conductor 46 connects the upper end of the right-hand section of that feedback winding with the top terminal of the resistor 32. A conductor 48 extends between the upper end of the left-hand section of the feedback winding 44 and a lower terminal 60. The lower ends of the two sections of the feedback winding 44 are connected together, as shown by FIG. 1. A junction 50 is provided in the conductor 48, and a resistor 56 has its bottom terminal connected to that junction. The top terminal of the resistor 56 is connected to the bottom terminal of the resistor 32 by a conductor 54. An adjustable resistor 58 is connected between the upper terminal 60 and a junction 52 in the conductor 54. The terminals 60 will be connected to a suitable, regulated source of D.C. voltage; and in one preferred embodiment of the present invention, that source supplies a voltage of thirteen volts.

The numeral 62 denotes the bias winding of the magnetic amplifier 20; and the bottom ends of the two sections of that winding are connected together. Terminals 64 are connected to a suitable source of regulated D.C. voltage, and the upper of those terminals is connected to the upper end of the left-hand section of the bias winding 62. The lower terminal 64 is connected to the upper end of the right-hand section of the feedback winding 62 by an adjustable resistor 66. In the said preferred embodiment of the present invention, that source supplies a voltage of thirteen volts. Adjustment of the movable contact of the variable resistor 66 will determine the amount of current flowing through the bias winding 62.

The numeral 68 denotes the primary winding of a power transformer; and that winding will be connected to a suitable source of alternating current. That transformer has a secondary winding 70 and a secondary winding 72; and one end of the secondary winding 70 is connected intermedate the diodes 26 and 28. The other end of the secondary winding 70 is connected to the lower ends of both sections of the output winding 22 of the magnetic amplifier 20.

The numeral 74 generally denotes a D.C. output, D.C. control, single phase, single-ended type magnetic amplifier; and that amplifier is substantially identical to the magnetic amplifier 20. The output winding of the magnetic amplifier 74 is denoted by the numeral 76; and the lower ends of the two sections of that winding are connected together and are also connected to one end of the secondary winding 72. The two sections of the output winding 76 are connected in a bridge rectifier which includes the diodes 78, 80, 82 and 84; and the junction between the diodes 80 and 82 is connected to the other end of the secondary winding 72. A junction 86 connects the junction between the diodes 82 and 84 to the bottom terminal of a resistor 88; and the top terminal of that resistor is connected to the righthand end of a second control winding 90 of the controlled magnetic amplifier, not shown, which can be connected to an indicating or controlling device. The other end of the control winding 90 is connected to a junction 91 adjacent the top terminal of an adjustable resistor 92. The bottom terminal of that resistor is connected to the junction between the diodes 78 and 80 by the junctions 38, 40 and 94.

The numeral 96 denotes the feedback winding of the magnetic amplifier 74; and the lower ends of the two sections of that winding are connected together. The upper end of the left-hand section of that feedback winding is connected to the junction 91 between the control winding 90 and the adjustable resistor 92. The upper end of the right-hand section of the feedback winding 96 is connected to the junction 35 between the control winding 34 and the variable impedance element 36.

The numeral 98 denotes the bias winding for the magnetic amplifier 74; and the bottom ends of the two sections of that winding are connected together. The upper end of the right-hand section of the bias winding 98 is connected to the upper terminal 64, and the upper end of the left-hand section of that bias winding is connected to the lower terminal 64 by an adjustable resistor 100. Adjustment of the position of the movable contact of the adjustable resistor 100 will determine how much current will flow through the bias winding 98.

The numeral 102 denotes a capacitor which is connected between the junctions 31 and 42 adjacent the bridge rectifier of the magnetic amplifier 20. The numeral 104 denotes a capacitor which is connected between the junctions 94 and 86 adjacent the bridge rectifier of the magnetic amplifier 74. The capacitors 102 and 104 serve as filter capacitors; and they tend to reduce the ripple current flowing through the control windings 34 and 90 and through the feedback windings 44 and 96. Those capacitors are not vital to the operation of he control system disclosed by FIG. 1, but they are desirable because they improve the performance of that control system.

The movable contact of the adjustable resistor 92 will be set so the resistance of that resistor will equal the impedance of the variable impedance element 36 at some desired condition within the anticipated range of operating conditions of that variable impedance element. For example, if the variable impedance element 36 is the platinum wire of a resistance thermometer, the movable contact of the adjustable resistor 92 will be set to match the resistance of the element 36 when the temperature of that element is at some desired value and the output voltage of the magnetic amplifier is at some desired value.

In the said preferred embodiment of the present invention, the movable contact of the adjustable resistor 92 was set so the resistance of that resistor equalled the impedance of the variable impedance element 36 when the temperature of that element was six hundred degrees Fahrenheit and the output voltage of the magnetic amplifier 20 was approximately fourteen volts.

The secondary winding 70 of the transformer will supply alternating current to the output winding 22 of the magnetic amplifier 20; and the bridge rectifier which includes the two sections of the output winding 22 plus the diodes 24, 26, 28 and 30 will rectify that alternating current and cause direct current to flow in the clockwise direction through the loop including resistor 32, control winding 34 and variable impedance element 36. The secondary winding 72 of the transformer will supply alternating current to the output winding of the magnetic amplifier 74; and the bridge rectifier which includes the two sections of the output winding 76 plus the diodes 78, 80, 82 and 84 will rectify that alternating current and cause direct current to flow in the counter clockwise direction through the loop including resistor 88, control winding 90 and adjustable resistor 92. As a result, voltage drops will appear across the impedance 36 and across the adjustable resistor 92.

The variable impedance element 36 and the adjustable resistor 92 are connected in series with the feedback winding 96 of the magnetic amplifier 74; and that element and that resistor are connected in such a way that the voltage drops across them buck each other. When the voltage drops across that element and across that resistor are unequal, they can cause current to flow through the feedback winding 96; but when that element and that resistor are equal, no current will flow through that feedback winding.

If the value of the voltage drop across the variable impedance element 36 were to decrease, current would flow through the feedback winding 96 in such a direction as to cause the value of the current in the output winding 76 to decrease; and the value of that current would continue to decrease until the value of the voltage drop across the resistor 92 fell to the value of the voltage drop across the variable impedance element 36. At such time, there would be no current flow through the feedback winding 96; because the voltage drops across the element 36 and across the resistor 92 would be equal. If the value of the voltage drop across the variable impedance element 36 had increased rather than decreased, the current would have flown through the feedback winding 96 in such a direction as to cause the value of the current in the output winding 76 to increase; and the value of that current would have continued to increase until the value of the voltage drop across the resistor 92 rose to the value of the voltage drop across the variable impedance element 36. At such time, there would be no current flow through the feedback winding 96; because the voltage drops across the element 36 and across the resistor 92 would again be equal.

The flow of current through the resistor 32 provides a voltage drop across that resistor. Also, a voltage drop will be provided across the resistor 56 by the current supplied by the source of regulated D.C. voltage which is connected to the terminals 60. The resistors 32 and 56 are connected in series with the feedback winding 44 of the magnetic amplifier 20; and those resistors are connected so that voltage drops across them buck each other. When those voltage drops are equal, no current will flow through the feedback winding 44. However, when the value of the voltage drop across the resistor 32 exceeds the value of the voltage drop across the resistor 56, a current will flow through the feedback winding 44 which will cause the value of the current in the output winding 22 to decrease; and the value of the current in that output winding will continue to decrease until the value of the voltage drop across the resistor 32 equals the value of the voltage drop across the resistor 56. If the value of the voltage drop across the resistor 32 had been less than, rather than greater than, the value of the voltage drop across the resistor 56, a current would have flown through the feedback winding 44 which would have caused the value of the current in the output winding 22 to increase; and the value of the current in that output winding would have continued to increase until the value of the voltage drop across the resistor 32 again equalled the value of the voltage drop across the resistor 56. The value of the voltage drop across the resistor 56 can be determined by adjusting the position of the movable contact of the adjustable resistor 58.

The movable contact of the adjustable resistor 66 will be set so the bias winding 62 will cause a current of predetermined value to flow through the loop which includes resistor 32, control winding 34 and variable impedance element 36. The movable contact of the adjustable resistor 100 will then be set so the bias winding 98 can cause the value of the current flowing through the adjustable resistor 92 to equal the said predetermined value of the current flowing through the variable impedance element 36 whenever the temperature of that variable impedance element is six hundred degrees Fahrenheit and the output voltage of the magnetic amplifier 20 is approximately fourteen volts. Also, the movable contact of the adjustable resistor 58 will be set so the values of the voltage drops across the resistors 32 and 58 will be equal. This means that whenever the temperature of the variable impedance element 36 is six hundred degrees Fahrenheit and the output voltage of the magnetic amplifier 20 is approximately fourteen volts, the output circuits of the magnetic amplifiers 20 and 74 will be in electrical balance, and the same values of current will flow through the control windings 34 and 90 of the controlled magnetic amplifier. Those control windings are wound in opposition to each other; and whenever the values of the currents flowing through those windings are equal, the controlled magnetic amplifier will cause a suitable indicating device to indicate that the temperature of the variable impedance element 36 is six hundred degrees Fahrenheit.

The feedback windings 44 and 96 can, and do, exercise a greater degree of control over the values of the currents in the output windings 22 and 76 than can the bias windings 62 and 98. Consequently, while those bias windings set the initial values of the currents in the output windings 22 and 76, the feedback windings 44 and 96 control the operating values of those currents.

If, in the said preferred embodiment of the present invention, the temperature of the variable impedance element 36 falls below six hundred degrees Fahrenheit, the resistance of that variable impedance element will decrease. Momentarily, that decrease in resistance will cause the value of the current flowing through the loop which includes resistor 32, control winding 34, and the variable impedance element 36 to rise above the said predetermined value; and the resulting increase in voltage drop across the resistor 32 will make the value of that voltage drop larger than the value of the voltage drop across the resistor 56. As a result, a current will flow through the feedback winding 44 which will reduce the value of the current flowing through resistor 32, control winding 34, and the variable impedance element 36 until that value reaches the said predetermined value.

If, in the said preferred embodiment of the present invention, the temperature of the variable impedance element 36 rises above six hundred degrees Fahrenheit, the resistance of that variable impedance element will increase. Momentarily, that increase in resistance will cause the value of the current flowing through the loop which includes resistor 32, control winding 34, and the variable impedance element 36 to fall below the said predetermined value; and the resulting decrease in voltage drop across the resistor 32 will make the value of that voltage drop smaller than the value of the voltage drop across the resistor 56. As a result, a current will flow through the feedback winding 44 which will increase the value of the current flowing through resistor 32, control winding 34, and the variable impedance element 36 until that value reaches the said predetermined value. This means that whether the impedance of the variable impedance element 36 goes up or down, the value of the current flowing through that variable impedance element will remain substantially constant.

As a result, the changes in the impedance of the variable impedance element 36 will provide changes in the voltage drops across that variable impedance element which will be directly proportional to the changes in the impedance of that element. Those changes in the voltage drop across the variable impedance element 36 will cause current to flow in the feedback winding 96 of the magnetic amplifier 74; and that current flow will cause the value of the current in the output winding 76 to change. The direction and value of the current flowing through the feedback winding 96 will be such that the change in the value of the current in the output winding 76 tends to make the voltage drop across the adjustable resistor 92 equal to the voltage drop across the variable impedance element 36.

Specifically, if the variable impedance element 36 is permitted to cool, the impedance of that variable impedance element will decrease and will cause the voltage drop across that variable impedance element to decrease; and current will then flow in the feedback winding 96 and cause the current flowing through the loop which includes resistor 88, control winding 90, and the adjustable resistor 92 to decrease. The resulting decrease in that current will reduce the value of the voltage drop across the adjustable resistor 92 until it equals the value of the voltage drop across the variable impedance element 36; and it will also reduce the ampere-turns of the control winding 90. Thereupon, the controlled magnetic amplifier, of which the control windings 34 and 90 are a part, will become unbalanced and will cause the indicating device to accurately indicate how much the variable impedance element 36 has cooled. Conversely, if the variable impedance element 36 is caused to get hotter, the impedance of that variable impedance element will increase and will cause the voltage drop across that variable impedance element to increase; and current will then flow in the feedback winding 96 and cause the current flowing through the loop which includes resistor 88, control winding 90, and the adjustable resistor 92 to increase. The resulting increase in that current will increase the value of the voltage drop across the adjustable resistor 92 until it equals the value of the voltage drop across the variable impedance element 36; and it will also increase the ampere-turns of the control winding 90. Thereupon, the controlled magnetic amplifier, of which the control windings 34 and 90 are a part, will become unbalanced and will cause the indicating device to accurately indicate how much hotter the variable impedance element 36 has become.

It will be noted that as the impedance of the variable impedance element 36 changes, the resistors 32 and 56 and the feedback winding 44 respond to the resulting momentary changes in current to restore the value of that current to the predetermined value. Hence the magnetic amplifier 20 substantially maintains a constant current despite a changing load, and provides a voltage drop across the variable impedance element 36 which is proportional to the changes in impedance of that element. The variable impedance element 36 and the adjustable resistor 92 and the feedback winding 96 will respond to the changes in voltage drop across that variable impedance element to enable the magnetic amplifier 74 to change the current flowing through that adjustable resistor. As a result, the magnetic amplifier 74 provides a changing current with a constant load.

If the value of the impedance of the variable impedance element 36 were to be represented by the letter Z, if the changes in the value of the impedance of that variable impedance element were to be represented as $dZ$, if the value of the resistance of the adjustable resistor 92 were to be represented by the letter R, if the value of the voltage between the terminals 35 and 91 were to be represented by the letter E, if the current flowing through the variable impedance element 36 were to be represented by the letter I, if the current flowing through the adjustable resistor 92 were to be represented by the letter $i$, and if the resistances of the various conductors were to be neglected, the following equation could be written:

$$E = I(Z+dZ) - i \cdot R$$

The magnetic amplifier 74 will maintain the voltage drops across the variable impedance element 36 and across the adjustable resistor 92 substantially equal; and hence in the above equation E can be considered to be zero. As a result:

$$i \cdot R = I(Z+dZ)$$

or $$i = \frac{I(Z+dZ)}{R}$$

The magnetic amplifier 20 will maintain the value of I substantially constant; and hence:

$$I = k$$

Further, because the usable output signal $S_0$ is the difference between the current $i$ flowing through the control winding 90 and the current I flowing through the control winding 34 of the controlled magnetic amplifier, not shown:

$$S_0 = i - I$$

Substituting $$\frac{I(Z+dZ)}{R}$$

for $i$, the equation becomes:

$$S_0 = \frac{I(Z+dZ)}{R} - I$$

Substituting $k$ for I, and providing the same denominator for all parts of the right-hand side of the equation, the equation then reads:

$$S_0 = \frac{k(Z+dZ) - k \cdot R}{R}$$

or $$S_0 = \frac{k \cdot Z + K \cdot dZ - k \cdot R}{R}$$

or $$S_0 = \frac{k(Z - R + dZ)}{R}$$

When the value of the impedance of the variable impedance element 36 becomes equal to the value of the resistance of the adjustable resistor 92, Z will equal R; and the equation will then read:

$$S_0 = \frac{K \cdot dZ}{R}$$

This means that an output current signal, which consists of the difference between two currents, is directly proportional to the changes in the impedance of the variable impedance element 36.

By setting the value of the resistance of the adjustable resistor 92 so it equals the value of the impedance of the variable impedance element 36 when that variable impedance element is hot, the present invention will give a hot temperature indication if the control system were, somehow, to fail. This is a desirable result because it will keep persons from being misled into the belief that the device with which the variable impedance element 36 is associated is not hot when, in fact, that unit is quite hot.

In the control system of FIG. 1, the magnetic amplifiers 20 and 74 are identical, the ohmic values of the control windings 34 and 90 are the same—being one hundred and twenty ohms—and the ohmic values of the resistors 32 and 88 are the same—being one hundred and fifty ohms. Further, the value of the impedance of the variable impedance element 36 can equal the resistance of the adjustable resistor 92. This means that any changes in the output currents of the two magnetic amplifiers 20 and 74, which are due to ambient or supply voltage effects, will be cancelled out completely whenever the value of the impedance of the variable impedance element 36 equals the resistance of the adjustable resistor 92, and will be at least partially cancelled out at all other times.

If the junction 38 were to be located immediately adjacent the bottom terminal of the adjustable resistor 92, the conductor which extends between the junction 35 and the top terminal of the variable impedance element 36 and the conductor which extends between the junction 38 and the bottom terminal of the variable impedance element 36 would both be long and would both have appreciable resistances. Further, both of those resistances would constitute seeming increases in the impedance of the variable impedance element 36. However, if the junction 38 were to be located immediately adjacent the bottom terminal of the variable impedance element 36, only the conductor which extends between junction 35 and the top terminal of the variable impedance element 36 would have appreciable resistance—the conductor which extends between the junction 38 and the bottom terminal of the variable impedance element 36 being so short as to have only negligible resistance. The resistance of the conductor which extends between junction 35 and the top terminal of the variable impedance element 36 would constitute a seeming increase in the impedance of the variable impedance element 36, but the resistance of the conductor which extends between junction 38 and the bottom terminal of the adjustable resistor 92 would constitute a seeming increase in the resistance of that resistor rather than a seeming increase in the impedance of the variable impedance element 36. Because the current flowing through the conductor which extends between the junction 38 and the bottom terminal of the adjustable resistor 92 flows in a direction opposite to the direction in which the current flows through the conductor which extends between junction 35 and the top terminal of the variable impedance element 36, the voltage drops across those conductors would largely cancel each other if the resistances of those conductors are equal. If the control system provided by the present invention, the junction 38 is located immediately adjacent the bottom terminal of the variable impedance element 36; and the conductor which extends between the junction 38 and the bottom terminal of the adjustable resistor 92 and the conductor which extends between junction 35 and the top terminal of the variable impedance element 36 are made from the same size and kind of wire, they are made the same in length, they have the same temperature coefficients of resistivity, and they are placed side by side so both of them are subjected to the same temperature conditions. As a result, the resistance of the conductor which extends between the junction 38 and the bottom terminal of the adjustable resistor 92 will so effectively cancel the resistance of the conductor which extends between junction 35 and the top terminal of the variable impedance element 36 that the values of those resistances can be neglected. Consequently, only the changes in the value of the impedance of the variable impedance element 36 will significantly affect the output signal $S_0$.

FIG. 2 shows a control system which includes a magnetic amplifier 20 that is identical to the correspondingly-numbered magnetic amplifier in FIG. 1. That amplifier has an output winding 22, a feedback winding 44, and a bias winding 62, and it also has a bridge rectifier which includes the diodes 24, 26, 28 and 30. The control system of FIG. 2 also includes a magnetic amplifier 174; and that magnetic amplifier has an output winding 76, a feedback winding 110, a feedback winding 96, and a bias winding 98. That magnetic amplifier also has a bridge rectifier which includes diodes 78, 80, 82 and 84. The windings 76, 96 and 98 are identical to the similarly-numbered windings in FIG. 1.

The secondary winding 72 of the transformer has one end thereof connected to the lower ends of both sections of the output winding 76, and the other end of that winding is connected to the junction between the diodes 80 and 82. The secondary winding 70 of the transformer is connected to the lower ends of both sections of the output winding 22 and is also connected to the junction between the diodes 26 and 28. The upper end of one section of the feedback winding 44 is connected to the lower terminal 60 by the conductor 48, and the upper end of the other section of that feedback winding is connected to the top terminal of the resistor 32. A resistor 56 and a conductor 54 connect the bottom terminal of the resistor 32 to the junction 50 in the conductor 48. An adjustable resistor 58 extends from the upper terminal 60 to a junction 52 in the conductor 54.

The bottom terminal of the resistor 32 is connected to the junction between the diodes 24 and 26 by the junction 71, but the top terminal of that resistor is connected directly to the junction 35 adjacent the top terminal of the variable impedance element 36; whereas in FIG. 1 the control winding 34 was interposed between the top terminal of the resistor 32 and the junction 35. The junction 40 in FIG. 2 is connected to the upper end of the left-hand section of the feedback winding 96 of the magnetic amplifier 174, whereas that junction was connected directly to the junction 42 in FIG. 1. The upper end of the right-hand section of the feedback winding 96 in FIG. 2 is connected to the junction between the diodes 28 and 30 by the junction 42.

The upper end of the left-hand section of the feedback winding 110 of the magnetic amplifier 174 is connected to the junction 94. The upper end of the right-hand section of that feedback winding is connected to the junction 40. In FIG. 1, on the other hand, the junction 94 was directly connected to the junction 40.

The junction between the diodes 82 and 84, of the bridge rectifier of the magnetic amplifier 174, is connected to the bottom terminal of the resistor 88 by the junction 86, as in FIG. 1; but the top terminal of the resistor 88 is connected directly to the junction 91 rather than through the control winding 90, as in FIG. 1. The variable impedance element 36 and the adjustable resistor 92 with the feedback winding 96 in FIG. 1, but in FIG. 2 the variable impedance element 36 and the adjustable resistor 92 are not connected to that feedback winding. Instead, the junction 35 is connected to a terminal 112 and the junction 91 is connected to a terminal 114.

The bias windings 62 and 98 of the magnetic amplifiers 20 and 174 are supplied with current by connecting the terminals 64 to a suitable source of regulated D.C. voltage. The movable contacts of the adjustable resistors 66 and 100 will be adjusted to provide the desired flow of bias current through those windings. The capacitors 102 and 104 will perform the same functions which the similarly-numbered capacitors in FIG. 1 perform.

The value of the resistance of the adjustable resistor 92 will be adjusted to match the impedance of the variable impedance element 36 at some condition in the range of operating conditions of that variable impedance element. The magnetic amplifiers 20 and 174 will be set so that whenever the value of the impedance of the variable impedance element 36 is equal to the resistance of the adjustable resistor 92, the current which flows through the resistor 32, the variable impedance element 36, and the feedback winding 96 will equal the current which flows through the resistor 88, the adjustable resistor 92, and the feedback winding 110. At such time, the voltage drops across the element 36 and across the resistor 92 will be equal; and hence the voltage between the terminals 112 and 114 will be zero. As a result, an indicating or controlling device connected to the terminals 112 and 114 will be at its null point.

If the value of the impedance of the variable impedance element 36 decreases, the current flowing through the resistor 32, the variable impedance element 36 and the feedback winding 96 will increase momentarily. The increased flow of current through the feedback winding 96 will cause the magnetic amplifier 174 to tend to increase the current flowing through the resistor 88, the adjustable resistor 92, and the feedback winding 110. That increased flow of current through the feedback winding 110 will cause the magnetic amplifier 174 to tend to decrease the current flowing through resistor 88, adjustable resistor 92, and feedback winding 110 and thereby tend to restore that current to its normal value.

As the current flowing through the resistor 32 tended to increase, when the value of the impedance of the variable impedance element 36 decreased, the voltage drop across that resistor tended to increase. As a result, current flowed through the feedback winding 44, and that current enabled the magnetic amplifier 20 to decrease the current flowing through the output winding 22 and thereby restored the current flowing through the resistor 32, the variable impedance element 36, and the feedback winding 96 to its normal value. As the current flowing through the feedback winding 96 was decreased to its normal value, that feedback winding caused the magnetic amplifier 174 to reduce the current flowing through the resistor 88, the adjustable resistor 92, and the feedback winding 110; and thereupon the feedback winding 110 caused the magnetic amplifier 174 to restore its output current to its normal value.

The overall result is that the magnetic amplifier 20 held the current flowing through the variable impedance element 36 substantially constant and the magnetic amplifier 174 held the current flowing through the adjustable resistor 92 substantially constant and substantially equal to the current flowing through the variable impedance element 36. This means that the voltage drop across the variable impedance element 36 decreased while the voltage drop across the adjustable resistor 92 remained unchanged. Consequently, reductions in the value of the impedance of the variable impedance element 36 will provide a proportional change in the voltage between the terminals 112 and 114.

If the value of the impedance of the variable impedance element 36 had increased rather than decreased, the current flowing through the resistor 32, the variable impedance element 36, and the feedback winding 96 would momentarily have decreased. The decrease in the flow of current through the feedback winding 96 would have caused the magnetic amplifier 174 to reduce the current flowing through the resistor 88, the adjustable resistor 92, and the feedback winding 110. That reduced flow of current through the feedback winding 110 would have caused the magnetic amplifier 174 to tend to increase the current flowing through resistor 88, adjustable resistor 92, and feedback winding 110 and thereby tend to restore that current to its normal value.

As the current flowing through the resistor 32 would have tended to decrease, when the value of the impedance of the variable impedance element 36 increased, the voltage drop across that resistor would have tended to decrease. As a result, current would have flowed through the feedback winding 44, and that current would have enabled the magnetic amplifier 20 to increase the current flowing through the output winding 22 and thereby would have restored the current flowing through the resistor 32, the variable impedance element 36, and the feedback winding 96 to its normal value. As the current flowing through the feedback winding 96 would have increased to its normal value, that feedback winding would have caused the magnetic amplifier 174 to increase the current flowing through the resistor 88, the adjustable resistor 92, and the feedback winding 110; and thereupon the feedback winding 110 would have caused the magnetic amplifier 174 to restore its output current to its normal value.

The overall result is that the magnetic amplifier 20 held the current flowing through the variable impedance element 36 substantially constant and the magnetic amplifier 174 held the current flowing through the adjustable resistor 92 substantially constant and substantially equal to the current flowing through the variable impedance element 36. This means that the voltage drop across the variable impedance element 36 increased while the voltage drop across the adjustable resistor 92 remained unchanged. Consequently increases in the value of the impedance of the variable impedance element 36 will provide a proportional change in the voltage between the terminals 112 and 114. In this latter illustration, the voltage between the terminals 112 and 114 would have had a polarity that was opposite to the polarity which the voltage between those terminals had when the value of the impedance of the variable impedance element 36 decreased.

In the operation of the control system of FIG. 2, the current flowing through the element 36 and the current flowing through the resistor 92 will be equal, and they will also be equal to a constant $k$. As a result, the following equation can be written:

$$E = k(Z+dZ) - kR$$

or $$E = k(Z - R + dZ)$$

Whenever the value of the impedance of the variable impedance element 36 is equal to the value of the resistance of the adjustable resistor 92, the equation becomes:

$$E = k \cdot dZ$$

This shows that the output voltage is directly proportional to the changes in the value of the impedance of the variable impedance element 36.

FIG. 3 shows a control system which is similar to the control system of FIG. 2. However, the magnetic amplifier 74 of FIG. 1 has been substituted for the magnetic amplifier 174 of FIG. 2; and the junction 40 has been connected directly to the junctions 42 and 94. In addition, the upper end of the right-hand section of the feedback winding 96 has been connected to the lower terminal 60 by junction 128, conductor 124, and junction 125. The upper end of the left-hand section of the feedback winding 96 has been connected to the top terminal of the resistor 88. The bottom terminal of the resistor 88 has been connected to the upper terminal 60 by junction 130, adjustable resistor 122, conductor 126, and junction 127. A resistor 120 is provided between the junctions 128 and 130. That resistor and the adjustable resistor 122 perform the same functions with respect to the resistor 88 which the resistor 56 and the adjustable resistor 58 perform with respect to the resistor 32. As a result, the feedback winding 96 and the feedback winding 44 are able to maintain substantially equal currents flowing through the adjustable resistor 92 and through the variable impedance element 36 irrespective of changes in the value of the impedance of that variable impedance element. The control system of FIG. 3 is not quite as accurate as the control system of FIG. 2, but it is practical and usable for many purposes.

In operating the control system of FIG. 3, the movable contact of the adjustable resistor 92 will be set to establish a value for the resistance of that resistor which is equal to a value of impedance that is within the normal operating range of impedance values of the variable impedance element 36. The output winding 76 of the magnetic amplifier 74 will establish a predetermined value for the current flowing through the adjustable resistor 92; and that value will equal the value of the current flowing through the variable impedance element 36. If the current flowing in the output winding 76 of the magnetic amplifier 74 were to tend to increase, due to changes in line voltage or the like, an increased voltage drop would appear across the resistor 88; and that increased voltage drop would cause current to flow through the feedback winding 96. The flow of that current would cause the magnetic amplifier 74 to reduce the output current to its normal value. Conversely, if the current flowing in the output winding 76 of the magnetic amplifier 74 were to tend to decrease, due to changes in line voltage or the like, a decreased voltage drop would appear across the resistor 88; and that decreased voltage drop would cause current to flow through the feedback winding 96. The flow of that current would cause the magnetic amplifier 74 to increase the output current to its normal value. In this way, the magnetic amplifier 74 will maintain a predetermined value of current flowing through the adjustable resistor 92.

If the current flowing in the output winding 22 of the magnetic amplifier 20 were to tend to increase, due to changes in line voltage or the like or due to changes in the value of the impedance of the variable impedance element 36, an increased voltage drop would appear across the resistor 32; and that increased voltage drop would cause a current to flow through the feedback winding 44. The flow of that current would cause the magnetic amplifier 20 to reduce the output current to its normal value. Conversely, if the current flowing in the output winding 22 of the magnetic amplifier 20 were to tend to decrease, due to changes in line voltage or the like or due to changes in the value of the impedance of the variable impedance element 36, a decreased voltage drop would appear across the resistor 32; and that decreased voltage drop would cause a current to flow through the feedback winding 44. The flow of that current would cause the magnetic amplifier 20 to increase the output current to its normal value. In this way, the magnetic amplifier 20 keeps the value of the current flowing through the variable impedance element 36 the same.

Moreover, the values of the currents flowing through the adjustable resistor 92 and through the variable impedance element 36 will be the same. As a result, whenever the value of the impedance of the variable impedance element 36 equals the value of the resistance of the adjustable resistor 92, the voltage drops across that element and across that resistor will be equal, and the voltage between terminals 112 and 114 will be zero. However, at all other values of the impedance of the variable impedance element 36 the voltage drops across that element and across the resistor 92 will be unequal and a voltage will appear between terminals 112 and 114. That voltage will have a value and a polarity which are proportional to the change in impedance of the variable impedance element 36.

FIG. 4 shows a variable resistance element 134 which can be a resistance thermometer, a strain gauge, or any other suitable variable resistance element. A junction 136 connects the bottom terminal of that variable impedance element to one terminal of a voltage source 138; and while that voltage source is shown as a battery, other suitable voltage sources could be used. The bottom terminal of the voltage source 138 is connected to the emitter of a transistor 144 by a junction 140. The base of that transistor is connected to the lower terminal of a resistor 148 by a junction 146; and the upper terminal of that resistor is connected to the emitter of a transistor 150. The collector of the transistor 150 is connected to the upper terminal of the variable impedance element 134 by a junction 152. A voltage source 154 is connected between the junction 146 and the base of the transistor 150. The collector of the transistor 144 is connected to a voltage source 158, and that voltage source is connected to the junction 140 by a resistor 156 and a junction 160.

A resistor 162 has the bottom terminal thereof connected to the junction 136, and has the top terminal thereof connected to the emitter of an NPN transistor 164. The collector of that transistor is connected to the base of a transistor 168 by a resistor 166; and the emitter of the transistor 168 is connected to the junction 140. The collector of the transistor 168 is connected to a voltage source 180, and that voltage source is connected to the junction 140 by a resistor 178 and the junction 160. The base of the transistor 164 is connected to the junction 152 by a conductor 172. The resistance values of the resistors 148 and 166 are preferably the same. Also, the resistance values of the resistors 156 and 178 are preferably the same. Further, the transistors 150 and 164 have the same characteristics and the transistors 144 and 168 have the same characteristics. In addition, the voltage sources 158 and 180 are preferably equal.

The resistor 162 is comparable to the adjustable resistor 92 of FIGS. 1-3; and, if desired, the resistor 162 could be an adjustable resistor. However, by proper selection of the value of the resistor 162, a fixed resistor rather than an adjustable resistor can be used. Similarly, in FIGS. 1-3, a fixed resistor of the desired value could be used in lieu of the adjustable resistor 92.

The voltage source 154 will coact with the voltage drop across the resistor 148 to provide the bias for the transistor 150; and that bias will enable that transistor to maintain the current through the variable impedance element 134 substantially constant irrespective of changes in the value of the impedance of that variable impedance element. For example, if the value of the impedance of the variable impedance element 134 decreases, there will be a momentary increase in the current flowing through the resistor 148. That increase in current will increase the voltage drop across that resistor and thereby change the bias of that transistor; and that changed bias will cause that transistor to reduce the current flowing through the variable impedance element 134 to its original value. Conversely, if the impedance of the variable impedance element 134 increases, there will be a momentary decrease in the current flowing through the resistor 148. That decrease in current will decrease the voltage drop across the resistor 148 and thereby change the bias of the transistor 150; and that changed bias will cause that transistor to increase the current flowing through the variable impedance element 134 to its original value. The fact that the transistor 150 maintains a substantially constant current flowing through the variable impedance element 134 means that the changes in the value of the impedance of that variable impedance element will vary the value of the voltage at the junction 152 with regard to the value of the voltage at the junction 136.

The voltage source 138 serves as the voltage source for the transistor 164 as well as for the transistor 150. The base of the transistor 164 is connected to the junction 152 by the conductor 172, and the varying voltage at the junction 152 will thus appear at the base of the transistor 164. As the voltage at the junction 152 changes, the conductivity of the transistor 164 will change and will thereby change the value of the current flowing through the resistor 162.

Whenever the value of the impedance of the variable impedance element 134 equals the value of the resistance of the resistor 162, the transistors 150 and 164 will permit equal currents to flow through that element and through that resistor. At such time, the values of the emitter-base currents of the transistors 144 and 168 will be equal; and hence those transistors will permit currents of equal value to flow through the resistors 156 and 178. At such time, the voltage between the outer ends of the resistors 156 and 178 will be zero because the voltage drops across those resistors will buck each other.

If the value of the impedance of the variable impedance element 134 decreases, and thus coacts with the constant current flowing through that variable impedance element to reduce the voltage drop across that variable impedance element, the transistor 164 will decrease its conductivity and thereby reduce the voltage drop across the resistor 162 until that voltage drop equals the voltage drop across the variable impedance element 134. The decreased conductivity of the transistor 164 will reduce the value of the emitter-base current of the transistor 168 and thereby cause that transistor to reduce the value of the current flowing through the resistor 178. At such time a voltage will appear between the outer terminals of the resistors 156 and 178, and that voltage will be proportional to the change in the impedance of the variable impedance element 134.

Conversely, if the value of the impedance of the variable impedance element 134 increases, and thus coacts with the constant current flowing through that variable impedance element to increase the voltage drop across that variable impedance element, the transistor 164 will increase its conductivity and thereby increase the voltage drop across the resistor 162 until that voltage drop equals the voltage drop across the variable impedance element 134. The increased conductivity of the transistor 164 will increase the value of the emitter-base current of the transistor 168 and thereby cause that transistor to increase the value of the current flowing through the resistor 178. At such time a voltage will appear between the outer terminals of the resistors 156 and 178, and that voltage will be proportional to the change in the impedance of the variable impedance element 134. However, that voltage will have a polarity which is opposite to the polarity which the voltage between the outer ends of those resistors had when the value of the impedance of the variable impedance element 134 decreased.

This means that whenever the value of the impedance of the variable impedance element 134 moves away from the value at which it equals the value of the resistance of the resistor 162, a voltage will appear between the outer ends of the resistors 156 and 178; and that voltage will have a value and polarity proportional to the change in the value of the impedance of the variable impedance element 134. That voltage can be used to operate a suitable indicating or controlling device.

FIG. 5 shows a control system which is generally similar to the control system shown by FIG. 4. However, the junction 146 is connected directly to the lower terminal of the voltage source 138 by a junction 188 rather than through the transistor 144, as shown by FIG. 4. Also, the transistor 164 is a PNP transistor, and the base of that transistor is disconnected from the top terminal of the variable impedance element 134 and, instead, is connected to the lower end of the resistor 166 by a voltage source 186 and a junction 190. Further, the lower end of that resistor is connected to the lower end of the voltage source 138 by the junctions 190 and 188 rather than through the transistor 168, as shown by FIG. 4. A terminal 194 is connected to the junction 152, and a terminal 196 is connected to the top terminal of the resistor 162 by a junction 192.

The voltage source 154 and the voltage drop across the resistor 148 provide the bias for the transistor 150, and the the voltage source 186 and the resistor 166 provide the bias for the transistor 164. Those voltage sources and those resistors are selected so currents of the same value will flow through the variable impedance element 134 and through the resistor 162 whenever the value of the impedance of the variable impedance element 134 is equal to the value of the resistance of the resistor 162. At such time, the voltage drops across the element 134 and the resistor 162 will be equal and the voltage between the terminals 194 and 196 will be zero.

If the value of the current flowing through the resistor 162 were, somehow, to increase, the voltage drop across the resistor 166 would increase; and the resulting change in the bias of the transistor 164 would enable that transistor to reduce the value of the current to its normal value. Conversely, if the current flowing through the resistor 162 were, somehow, to decrease, the voltage drop across the resistor 166 would decrease; and the resulting change in the bias of the transistor 164 would enable that transistor to increase the value of the current to its normal value. In this way, the transistor 164 will maintain the value of the current flowing through, and will maintain the value of the voltage drop across, the resistor 162 constant.

If the impedance of the variable impedance element 134 decreases, the current through the resistor 148 will momentarily increase. The resulting increase in voltage drop across that resistor will change the bias on the transistor 150 and thereby enable that transistor to reduce the current flowing through the variable impedance element 134. That reduction in the value of the current will continue until that value has been restored to normal. The decrease in the value of the impedance of the variable impedance element 134 will coact with the constant value of the current to produce a reduced voltage drop across that variable impedance element; and hence a difference of voltage will appear between the terminals 194 and 196. That difference in voltage can be used to actuate a suitable indicating or controlling device.

Conversely, if the value of the impedance of the variable impedance element 134 were to increase, there would be a momentary decrease in the value of the current flowing through the resistor 148. The resulting decreased voltage drop across that resistor would change the bias of the transistor 150 and thereby enable that transistor to cause the current flowing through the variable impedance element 134 to increase. That increase will continue until the value of the current flowing through that variable impedance element is restored to normal. At this time, a difference of voltage will appear between the terminals 194 and 196, and that difference in voltage can be used to actuate a suitable indicating or controlling device.

Whether the value of the impedance of the variable impedance element 134 increases or decreases, the difference of voltage which appears between the terminals 194 and 196 will be proportional to that change in the value of that impedance. However, when the value of that impedance increases, the difference of voltage which appears between the terminals 194 and 196 will be of one polarity; whereas when the value of that impedance decreases, the difference of voltage which appears between the terminals 194 and 196 will be of opposite polarity.

FIGS. 6 and 7 show another embodiment of control system provided by the present invention plus a wide range amplifier and a narrow range amplifier controlled by that control system. Many of the components shown by FIG. 6 are identical to similarly-numbered components shown by FIG. 1; and the similarly-numbered components are connected in the same way in the two views, although the arrangements shown by FIGS. 1 and 6 look different.

For example, the variable impedance element 36 is connected intermediate the junctions 35 and 38, and the adjustable resistor 92 is connected intermediate the junctions 38 and 91. The junction 40 is connected to the junction between diodes 28 and 30, of the bridge rectifier of the magnetic amplifier 20, by the junction 42; and the junction 40 is connected to the junction between diodes 78 and 80, of the bridge rectifier of the magnetic amplifier 74, by the junction 94. The junction between diodes 24 and 26 of the bridge rectifier of the magnetic amplifier 20 is connected to the bottom terminal of the resistor 32 by the junction 31; and the junction between diodes 82 and 84 of the bridge rectifier of the magnetic amplifier 74 is connected to the bottom terminal of the resistor 88 by the junction 86. The resistor 32 is connected in series relation with control winding 44 and with resistor 56; and the adjustable resistor 58 coacts with the regulated D.C. voltage supplied to the terminals 60 to establish a predetermined voltage drop across the resistor 56. The bias windings 62 and 98 are supplied with a regulated D.C. voltage by the terminals 64 and the adjustable resistors 66 and 100, and while two sets of terminals 64 are shown only one set will usually be used.

Alternating current will be supplied to the output winding 22 of the magnetic amplifier 20 by the terminals 200—one of those terminals being connected to the bottom ends of both sections of that output winding and the other of those terminals being connected to the junction between diodes 26 and 28. The bridge rectifier of the magnetic amplifier 20 will rectify the current from the output winding 22, and the capacitor 102 will tend to remove the ripple from that current. Alternating current will be supplied to the output winding 76 of the magnetic amplifier 74 by the terminals 202—one of those terminals being connected to the bottom ends of both sections of that output winding and the other of those terminals being connected to the junction between diodes 80 and 82. The bridge rectifier of the magnetic amplifier 74 will rectify the current from the output winding 76, and the capacitor 104 will tend to remove the ripple from that current.

The control winding 34 is part of a wide range magnetic amplifier 212 shown in FIG. 7; and that control winding plus the control winding 234 of a narrow range magnetic amplifier 260 shown in FIG. 7 are connected in series relation between the terminal 35 and the top terminal of resistor 32 by conductors 204, 302 and 206. The control winding 90 is part of the wide range magnetic amplifier 212; and that control winding plus the control winding 290 of the narrow range magnetic amplifier 260 are connected in series relation between the terminal 91 and the top terminal of the resistor 88 by the conductors 208, 300 and 210.

The magnetic amplifier 212 has a bias winding 214; and that winding is connected to a source of regulated D.C. voltage by terminals 218 and adjustable resistor 216. That magnetic amplifier has a feedback winding 220, and an adjustable resistor 222 is connected to the upper end of the left-hand section of that feedback winding. That magnetic amplifier has an output winding 224, and the two sections of that output winding form part of a bridge rectifier which includes the diodes 236, 238, 240 and 242. Alternating current will be supplied to the terminals 244; and one of those terminals is connected to the lower ends of the two sections of the output winding 224 while the other of those terminals is connected to the junction between the diodes 238 and 240. A capacitor 226 is connected between the upper ends of the two sections of the output winding 224, and that capacitor will help remove the ripple from the D.C. output current of the magnetic amplifier 212.

An inductor 246 and a capacitor 248 constitute a series-resonant circuit that will provide a desirable filtering action. A resistor 250 will constitute a bleeder resistor and will help stabilize the output of the winding 224. Terminals 252 and 254 will be connected to a suitable wide range indicating or controlling device, not shown. Junctions 256 and 258 connect the feedback winding 220 to the terminals 252 and 254, respectively.

The magnetic amplifier 260 has a bias winding 262; and that winding is connected to a source of regulated D.C. voltage by terminals 226 and adjustable resistor 264. That magnetic amplifier has a feedback winding 268, and an adjustable resistor 270 is connected to the upper end of the left-hand section of that feedback winding. That magnetic amplifier has an output winding 272, and the two sections of that output winding form part of a bridge rectifier which includes the diodes 276, 278, 280 and 282. Alternating current will be supplied to the terminals 284; and one of those terminals is connected to the lower ends of the two sections of the output winding 272 while the other of those terminals is connected to the junction between the diodes 278 and 280. A capacitor 274 is connected between the upper ends of the two sections of the output winding 272, and that capacitor will help remove the ripple from the D.C. output current of the magnetic amplifier 260.

An inductor 286 and a capacitor 288 constitute a series-resonant circuit that will provide a desirable filtering action. A resistor 291 will constitute a bleeder resistor and will help stabilize the output of the winding 272. Terminals 292 and 294 will be connected to a suitable narrow range indicating or controlling device, not shown. Junctions 296 and 298 connect the feedback winding 268 to the terminals 292 and 294, respectively.

In FIG. 7, as in FIG. 1, the control winding 34 is connected so it bucks the control winding 90. The control winding 90 is connected to aid the output winding 224 while the control winding 34 is connected to buck that output winding. The control winding 234 is connected so it bucks the control winding 290. The control winding 234 is connected to aid the output winding 272 while the control winding 290 is connected to buck that output winding.

The number of turns of the control windings 234 and 290 will preferably be equal, and those windings will be formed from wire of the same cross section, resistivity and temperature coefficient of resistivity. As a result, the ampere-turns in those windings will be equal, and the magnetic amplifier 260 will be at its null point, whenever the values of the currents flowing through variable impedance element 36 and adjustable resistor 92 are equal.

The number of turns of the control windings 34 and 90 will preferably not be equal, and those windings will be formed from wire of the same cross section, resistivity and temperature coefficient of resistivity. As a result, the ampere-turns in those windings will be equal and the magnetic amplifier 212 will be at its null point, only when the values of the currents flowing through variable impedance element 36 and adjustable resistor 92 are different by a predetermined value and in a predetermined direction.

For purposes of illustration it will be assumed that the variable impedance element 36 is a platinum wire of a resistance thermometer, and that it is desirable to have the wide range magnetic amplifier 212 drive an indicating device with a range of from fifty to six hundred degrees Fahrenheit. Further it will be assumed that it is desirable to have the narrow range magnetic amplifier 260 drive an indicating device with a range of from four hundred to five hundred degrees Fahrenheit. In such a case, the movable contact of the adjustable resistor 92 will be set so that value of the resistance of that resistor will equal the value of the impedance of the variable impedance element 36 when the temperature of that variable impedance element is five hundred degrees Fahrenheit. The number of turns in the control winding 34 will then be made sufficiently smaller than the number of turns in the control winding 90 to enable the total number of ampere-turns in those windings to be equal when the current flowing through the winding 90 will be minimal, as it will be when the temperature of the variable impedance element 36 is fifty degrees Fahrenheit. This means that the magnetic amplifier 212 will be at its null point when the temperature of the variable impedance element 36 is five hundred degrees Fahrenheit, will be providing its minimum signal when the temperature of the variable impedance element 36 is fifty degrees Fahrenheit and will be providing a maximum signal when the temperature of the variable impedance element 36 is six hundred degrees Fahrenheit. In the embodiment of wide range magnetic amplifier shown by FIG. 7, the number of turns in the control winding 34 was fifty and the number of turns in the control winding 90 was one hundred.

The magnetic amplifier 20 in FIG. 6 will maintain a substantially constant current flow through the variable impedance element 36 and through the control windings 234 and 34; and that constant current flow will coact with temperature-induced changes in the value of the impedance of the variable impedance element 36 to change the voltage drop across that variable impedance element. The resulting changes in voltage drop across the variable impedance element 36 will cause current to flow through the feedback winding 96 of the magnetic amplifier 74; and, as a result, the output current of that magnetic amplifier will change to keep the voltage drop across the adjustable resistor 92 equal to the voltage drop across the variable impedance element 36. The said changes in the output current of the magnetic amplifier 74 will cause the ampere-turns of the control windings 90 and 290 to change relative to the substantially constant ampere-turns of the control windings 34 and 234, respectively; and the resultant changes in the net ampere-turns of the control windings 34 and 90 will cause the magnetic amplifier 212 to change the value of its output current while the resultant changes in the net ampere-turns of the control windings 234 and 290 will cause the magnetic amplifier 260 to change the value of its output current.

Because the magnetic amplifier 212 is at its null point whenever the temperature of the variable impedance element 36 is five hundred degrees Fahrenheit, increases in the temperature of that variable impedance element will cause the ampere-turns of the control winding 90 to overcome the ampere-turns of the control winding 34 and will cause the magnetic amplifier 212 to progressively increase its output current. Such increases in output current will be in proportion to the increases in temperature of the variable impedance element 36; and when the temperature of that variable impedance element is six hundred degrees Fahrenheit the output current of the magnetic amplifier 212 will be great enough to cause an indicating device, not shown, which is connected to the terminals 252 and 254, to indicate that temperature.

When the net ampere-turns between the control windings 234 and 290 of the narrow range amplifier 260 are zero, as they will be when the temperature of the variable impedance element 36 is five hundred degrees and the currents flowing through that element and through the adjustable resistor 92 are thus equal, the magnetic amplifier 260 will be at its null point; and an indicating device connected to the terminals 292 and 294 will indicate the five hundred degree Fahrenheit temperature. As the temperature of the variable impedance element 36 decreases, the output current of the magnetic amplifier 74 will decrease; and the resulting decrease in the ampere-turns of the control winding 290 will enable the output current of the magnetic amplifier 260 to decrease. The indicating device connected to the terminals 292 and 294 will respond to that decreased output current to move its indicator along the scale to indicate the reduction in the temperature of the variable impedance element 36. When that indicator reaches one end of that scale, the temperature of the variable impedance element 36 will be four hundred degrees Fahrenheit; and any further decreases in the temperature of the variable impedance element 36 would merely tend to drive that indicator beyond the lower end of that scale.

The extent to which further decreases in the temperature of the variable impedance element 36 could tend to drive the indicator beyond the said one end of the scale will be limited, because the magnetic amplifier 260 will tend to cut off. If the temperature of the variable impedance element 36 rises above five hundred degrees Fahrenheit, the net ampere-turns of the control windings 234 and 290 will tend to drive the indicator beyond the other end of the scale; but the extent to which further increases in the temperature of the variable impedance element 36 could tend to drive the indicator beyond the other end of the scale will be limited, because the magnetic amplifier 260 will tend to saturate. As a result, the magnetic amplifier 260 will enable the indicating device connected to it to indicate just the temperature within the desired range from four hundred to five hundred degrees Fahrenheit.

The control system of FIG. 6 is shown as driving a wide range magnetic amplifier 212 and a narrow range magnetic amplifier 260. If desired, that control system could be made to drive further magnetic amplifiers.

The feed back windings 268 and 220 respectively, of the magnetic amplifiers 260 and 212 are desirable because they improve the linearity of the control characteristics of those magnetic amplifiers. Also, those feedback windings are desirable because they shorten the response times of those magnetic amplifiers. The time response of the overall system shown in FIGS. 6 and 7 is quite short—being less than one cycle of sixty cycle alternating current. As a result, the present invention provides prompt responses to changes in the value of the impedance of the variable impedance element 36.

The various embodiments of control systems of the present invention provide highly accurate, as well as prompt, responses. This is due to the fact that the principal limit to accurate response of any of those embodiments is the precision with which the power supplies can be controlled; and such power supplies can be controlled with a high degree of precision. Where transistor or vacuum tube amplifiers are to be used, those amplifiers should be operated as Class A amplifiers—thereby making sure that the responses of those amplifiers are fully linear.

The drawing shows control systems using amplifiers, such as magnetic amplifiers and transistor amplifiers, but amplifiers are not essential. For example, the control systems of FIGS. 2, 3 and 5 could use any kind of constant-current sources in lieu of the amplifiers shown in those views. One type of constant-current source which could be used would be a battery with a large impedance in series with the lesser impedance variable impedance element 36 or 134 or in series with the lesser impedance resistor 92 or 162. Another type of constant-current source which could be used would be a generator that had a high internal impedance. If desired, in FIG. 1 or FIG. 4, a constant-current source could be used in lieu of the amplifier which controls the current flowing through the variable impedance element 36 or 134. Also, if desired in FIGS. 1–6, one type of amplifier could be used to control the current flowing through the variable impedance element 36 or 134 while another type of amplifier could be used to control the current flowing through the resistor 92 or 162.

The various embodiments of control systems provided by the present invention are rugged, and they readily withstand shock and vibration. Further, those embodiments of control systems have long lives because they use static components. Those embodiments of control systems can be used in installations where ambient temperatures are high; and, in such installations, the accuracy of those embodiments of control systems can be further improved by using thermistors for some of the resistors.

In many instances it will be desirable to select a reference impedance 92 or 162 which has an impedance value that is equal to one of the impedance values in the range of the variable impedance element 36 or 134, respectively. Where this is done, the output curve of the control system can pass through, or very close to, the zero value. However, in some instances, it may not be necessary to have the output curve of the control system pass through, or very close to, the zero value; and in those instances the impedance value of the reference impedance 92 or 162 need not equal one of the impedance values in the range of the variable impedance element 36 or 134, respectively. In fact, where the control system is intended to actuate an indicating or controlling device that can not be actuated by a zero value signal and, instead, requires a signal having a finite value, the control system need not supply a signal having a zero value or any other value below that finite value. Consequently, in some instances, the reference impedance can be selected so it will enable the control system to provide signals which are always spaced from zero by some finite values; and where this is done a less expensive variable impedance element can usually be employed because variable impedance devices that are accurate over long ranges are usually more expensive.

If it were to be assumed that the highest value to which the impedance of the adjustable impedance 92 in FIG. 1 could be set was smaller than the value of the smallest impedance value of the variable impedance element 36, the magnetic amplifier 74 would always provide a higher value for the current flowing through the impedance 92, and thus through the control winding 90, than the magnetic amplifier 20 would maintain through the impedance 36, and thus through the control winding 34. As a result, the signal provided by the control system of FIG. 1 would always be spaced from zero by a finite value. That finite value would increase as the impedance value of the variable impedance element 36 increased, and that finite value would decrease as the impedance value of the variable impedance element 36 decreased because the magnetic amplifier 20 would keep the current flowing through control winding 34 and element 36 substantially constant while the magnetic amplifier 74 would keep the voltage drop across the impedance 92 substantially equal to the voltage drop across the impedance 36, but that finite value would always space the signal value from zero.

Where desired, the value of the impedance of the impedance 92 or 162 in FIGS. 1 and 4, respectively, can be made to vary with changes in temperature, pressure or the like. In such a case, the current source connected to the variable impedance element 36 or 134 will maintain a constant current through that element, and thereby provide a voltage drop across that impedance element which will vary in proportion to the changes in the value of the impedance of that element; and the current source for the impedance element 92 or 162 will vary the current through the latter element to keep the voltage drop across that latter element equal to the voltage drop across the impedance element 36 or 134, respectively. This means that whether the value of the impedance element 36 or 134 changes the voltage drop across that element or the value of the impedance element 92 or 162 changes and tends to change the voltage drop across the latter element, the current source for the impedance element 92 or 162 will change the value of the current flowing through that latter element to keep the voltage drop across that latter element substantially equal to the voltage drop across he impedance element 36 or 134. Those changes in that current, irrespective of whether they are due to changes in the impedance value of the element 36 or 134 or to changes in the impedance value of the element 92 or 162, will reflect the net difference between the temperatures, pressures or other conditions affecting those impedance elements.

In FIGS. 2, 3 and 5 also, the value of the reference impedance 92 or 162 can be made to vary with changes in temperature, pressure or the like. In such a case the current flowing through that impedance will be maintained substantially constant and the voltage drop across that impedance will be proportional to the changes in the impedance value of that reference impedance. That changing voltage drop will coact with the voltage drop across the variable impedance element 36 or 134 to produce a net voltage difference which is a function of the changing impedance values of that reference impedance and of that variable impedance element.

In FIGS. 1–6, the current sources have been shown as D.C. current sources, and where such sources are used, the variable impedance elements and the reference impedances will be resistance-type impedances. If inductive or capacitive impedance elements are desired, the D.C. sources in FIGS. 1–6 could be replaced by A.C. sources.

Whereas the drawing and accompanying description have shown and described several preferred embodiments of the present invention it should be apparent to those skilled in the art that various changes may be made in the form of the invention without affecting the scope thereof.

What I claim is:

1. In a static control system that can automatically determine changes in impedance of a variable impedance element and that can automatically use such changes to actuate an indicating or controlling device, a circuit which includes said variable impedance element and a constant current source in the form of a magnetic amplifier that maintains a substantially constant current flow through said variable impedance element despite changes in the impedance value of said variable impedance element, a reference impedance, and a second circuit that includes said reference impedance and a second current source in the form of a magnetic amplifier, said reference impedance having an impedance value that is intermediate the highest and lowest impedance values of said variable impedance element, the first said circuit and said second circuit being interconnected to enable changes in the impedance value of said variable impedance element to be compared with the impedance value of said reference impedance, said variable impedance element and said reference impedance coacting, respectively, with said constant current source and said second current source to provide an electrical balance between said circuits whenever the impedance value of said variable impedance element is equal to the impedance value of said reference impedance and to provide an electrical unbalance between said circuits at other impedance values of said variable impedance element, said electrical unbalance being adapted to actuate an indicating or controlling device, said constant current source maintaining the flow of current through said variable impedance element substantially constant irrespective of the value of the current which said second current source causes to flow through said reference impedance.

2. In a control system that can determine changes in impedance of a variable impedance element and that can use such changes to actuate an indicating or controlling device, a circuit which includes said variable impedance element and the output winding of a magnetic amplifier and a control winding of a first controlled magnetic amplifier and a control winding of a second controlled magnetic amplifier, the first said magnetic amplifier having a feedback winding that is connected to said circuit to enable said first magnetic amplifier to maintain the value of the current flowing in said circuit substantially constant, a reference impedance and a second circuit that includes said reference impedance and the output winding of a fourth magnetic amplifier and a second control winding of said first controlled magnetic amplifier and a second control winding of said second controlled magnetic amplifier, the first said and said second control windings of said first controlled magnetic amplifier bucking each other but having unequal numbers of turns, the first said and said second control windings of said second controlled magnetic amplifier bucking each other and providing a null point for said second controlled magnetic amplifier which is different from the null point for said first controlled magnetic amplifier, said reference impedance having an impedance value that is equal to one impedance value of said variable impedance element, said fourth magnetic amplifier having a feedback winding, said feedback winding of said fourth magnetic amplifier being connected to the first said circuit and thereby responding to changes in the impedance value of said variable impedance element to cause said fourth magnetic amplifier to provide a corresponding and proportional change in the value of the current flowing in said second circuit, biasing means for said fourth magnetic amplifier, said biasing means and said feedback winding of said fourth magnetic amplifier causing said fourth magnetic amplifier to keep the current flowing through said second circuit equal to the current flowing through the first said circuit whenever the value of the impedance of said variable impedance element equals the value of the impedance of said reference impedance, said feedback winding of said fourth magnetic amplifier making the current flowing through said second circuit different from the current flowing through the first said circuit whenever the value of the impedance of said variable impedance element differs from the value of the impedance of said reference impedance, the first said and said second control windings of said first controlled magnetic amplifier enabling said first controlled magnetic amplifier to provide a different output signal when the values of the currents flowing in said circuits are equal than it provides when the values of the currents flowing in said circuits are unequal, the first said and said second control windings of said second controlled magnetic amplifier enabling said second controlled magnetic amplifier to provide a different output signal when the values of the currents flowing in said circuits are equal than it provides when the values of the currents flowing in said circuits are unequal, one of said controlled magnetic amplifiers being a wide range amplifier and the other of said controlled magnetic amplifiers being a narrow range amplifier.

3. In a control system that can determine changes in impedance of a variable impedance element and that can use such changes to actuate an indicating or controlling device, a circuit which includes said variable impedance element and the output winding of a magnetic amplifier and a control winding of a controlled magnetic amplifier, the first said magnetic amplifier having a feedback winding that is connected to said circuit to enable said first magnetic amplifier to maintain the value of the current flowing in said circuit substantially constant, a reference impedance, and a second circuit that includes said reference impedance and the output winding of a third magnetic amplifier and a second control winding of said controlled magnetic amplifier, said control windings of said controlled magnetic amplifier bucking each other, said reference impedance having an impedance value that is equal to one impedance value of said variable impedance element, said third magnetic amplifier having a feedback winding, said feedback winding of said third magnetic amplifier being connected to the first said circuit and thereby responding to changes in the impedance value of said variable impedance element to cause said third magnetic amplifier to provide a corresponding and proportional change in the value of the current flowing in said second circuit, biasing means for said third magnetic amplifier, said biasing means and said feedback winding of said third magnetic amplifier causing said third magnetic amplifier to keep the current flowing through said second circuit equal to the current flowing through the first said circuit whenever the value of the impedance of said variable impedance element equals the value of the impedance of said reference impedance, said feedback winding of said third magnetic amplifier making the current flowing through said second circuit different from the current flowing through the first said circuit whenever the value of the impedance of said variable impedance element differs from the value of the impedance of said reference impedance, said control windings of said controlled magnetic amplifier enabling said controlled magnetic amplifier to provide a different output signal when the values of the currents flowing in said circuits are equal than it provides when the values of the currents flowing in said circuits are unequal, the first said magnetic amplifier maintaining the flow of current through said variable impedance element and through the first said control winding of said controlled magnetic amplifier substantially constant irrespective of the current which said third magnetic amplifier causes to flow through said reference impedance and said second control winding of said controlled magnetic amplifier.

4. In a control system that can determine changes in impedance of a variable impedance element and that can use such changes to actuate an indicating or controlling device, a circuit which includes said variable impedance element and the output winding of a magnetic amplifier and a control winding of a controlled magnetic amplifier, the first said magnetic amplifier being adapted to maintain the value of the current flowing in said circuit substantially constant irrespective of changes in the value of the impedance of said variable impedance element, a reference impedance, and a second circuit that includes said reference impedance and the output winding of a third magnetic amplifier and a second control winding of said controlled magnetic amplifier, said control windings of said controlled magnetic amplifier bucking each other, said reference impedance having an impedance value that is equal to one impedance value of said variable impedance element, said third magnetic amplifier being connected to the first said circuit and thereby being adapted to respond to changes in the impedance value of said variable impedance element to provide a corresponding and proportional change in the value of the current flowing in said second circuit, said control windings of said controlled magnetic amplifier enabling said controlled magnetic amplifier to provide a different output signal when the values of the currents flowing in said circuits are equal than it provides when the values of the currents flowing in said circuits are unequal, the first said magnetic amplifier maintaining the flow of current through said variable impedance element and through the first said control winding of said controlled magnetic amplifier substantially constant irrespective of the current which said third magnetic amplifier causes to flow through said reference impedance and said second control winding of said controlled magnetic amplifier.

5. In a control system that can determine changes in impedance of a variable impedance element and that can use such changes to actuate an indicating or controlling device, a circuit which includes said variable impedance element and a constant current source that maintains a substantially constant current flow through said variable impedance element despite changes in the impedance value of said variable impedance element, a reference impedance, and a second circuit that includes said reference impedance and the output winding of a magnetic amplifier, said reference impedance having an impedance value that is equal to one impedance value of said variable impedance element, said magnetic amplifier having a feedback winding, said feedback winding of said magnetic amplifier being connected to the first said circuit and thereby responding to changes in the impedance valve of said variable impedance element to cause said magnetic amplifier to provide a corresponding and proportional change in the value of the current flowing in said second circuit, said magnetic amplifier being biased so the current flowing through said feedback winding thereof will keep the current flowing through said second circuit equal to the current flowing through the first said circuit whenever the value of the impedance of said variable impedance element equals the value of the impedance of said reference impedance, the bias on said magnetic amplifier enabling said feedback winding to make the current flowing through said second circuit different from the current flowing through the first said circuit whenever the value of the impedance of said variable impedance element differs from the value of the impedance of said reference impedance.

6. In a control system that can determine changes in impedance of a variable impedance element and that can use such changes to actuate an indicating or controlling device, a circuit which includes said variable impedance element and a constant current source that maintains a substantially constant current flow through said variable impedance element despite changes in the impedance valve of said variable impedance element, a reference impedance, and a second circuit that includes said reference impedance and an amplifier, said reference impedance having an impedance value that is equal to one impedance value of said variable impedance element, said amplifier being connected to the first said circuit and thereby being adapted to respond to changes in the impedance value of said variable impedance element to provide a corresponding and proportional change in the value of the current flowing in said second circuit, said amplifier responding to its connection to the first said circuit to keep the current flowing through said second circuit equal to the current flowing through the first said circuit whenever the value of the impedance of said variable impedance element equals the value of the impedance of said reference impedance, said amplifier responding to its connection to the first said circuit to make the current flowing through said second circuit different from the current flowing through the first said circuit whenever the value of the impedance of said variable impedance element differs from the value of the impedance of said reference impedance.

7. In a control system that can determine changes in impedance of a variable impedance element and that can use such changes to actuate an indicating or controlling device, a circuit which includes said variable impedance element and the output winding of a magnetic amplifier, said magnetic amplifier maintaining a substantially constant current flow through said variable impedance element despite changes in the impedance value of said variable impedance element, a reference impedance, and a second circuit that includes said reference impedance and the output winding of a second magnetic amplifier, one terminal of said reference impedance being connected to one terminal of said variable impedance element so the voltage drop across said variable impedance element can be readily compared with the voltage drop across said reference impedance, said reference impedance having an impedance value that is equal to one impedance value of said variable impedance element, said magnetic amplifiers causing current to flow through said variable impedance element and through said reference impedance so the voltage drops across said variable impedance element and across said reference impedance will buck each other, said second magnetic amplifier having a feedback winding that is connected in series with said variable impedance element and with said reference impedance, said feedback winding responding to differences between the voltage drops across said variable impedance element and said reference impedance to permit current to flow through it and responding to said current flow to cause said second magnetic amplifier to change the current flowing through said reference impedance, said feedback winding having current flowing through it as long as the voltage drops across said variable impedance element and said reference impedance are not equal, whereby said second magnetic amplifier will act to make the voltage drop across said reference impedance equal the voltage drop across said variable impedance element as the impedance of said variable impedance element changes.

8. In a control system that can determine changes in impedance of a variable impedance element and that can use such changes to actuate an indicating or controlling device, a circuit which includes said variable impedance element and a magnetic amplifier that maintains a substantially constant current flow through said variable impedance element, a reference impedance, and a second circuit that includes said reference impedance and a second magnetic amplifier, said reference impedance having an impedance value that is equal to one of the values of impedance of said variable impedance element, said second magnetic amplifier having a feedback winding that is connected to the first said circuit to sense changes in the impedance value of said variable impedance element, said feedback winding responding to a change in the impedance of said variable impedance element to have a different value of current flow through it and thereby enable said second magnetic amplifier to cause a corresponding and proportional change in the current flowing in said second circuit, said variable impedance element and said reference impedance coacting, respectively, with the first said and said second magnetic amplifiers to provide an electrical balance between said circuits at a predetermined impedance value of said variable impedance element and to provide an electrical unbalance between said circuits at other impedance values of said variable impedance element, said electrical unbalance being adapted to produce a net difference between the currents flowing in the first said and said second circuits to actuate an indicating or controlling device.

9. In a control system that can determine changes in impedance of a variable impedance element and that can use such changes to actuate an indicating or controlling device, a circuit which includes said variable impedance element and an amplifier that maintains a substantially constant current flow through said variable impedance element, a reference impedance, and a second circuit that includes said reference impedance and a second amplifier, said reference impedance having an impedance value that is equal to one impedance value of said variable impedance element, one terminal of said reference impedance being connected to one terminal of said variable impedance element so the voltage drop across said variable impedance element can be readily compared with the voltage drop across said reference impedance, said second amplifier being connected to sense differences between the voltage drops across said variable impedance element and said reference impedance, said second amplifier responding to differences between the voltage drops across said variable impedance element and said reference impedance to change the current flowing through said reference impedance, said second amplifier becoming active whenever there is a difference between said voltage drops across said variable impedance element and said reference impedance and thereby acting to make the voltage drop across said reference impedance equal the voltage drop across said variable impedance element as the impedance of said variable impedance element changes.

10. In a control system that can determine changes in impedance of a variable impedance element and that can use such changes to actuate an indicating or controlling device, a circuit which includes said variable impedance element and a constant current source that maintains a substantially constant current flow through said variable impedance element despite changes in the impedance value of said variable impedance element, a reference impedance, and a second circuit that includes said reference impedance and a second current source, said second current source keeping the current flow through said reference impedance substantially constant, one terminal of said reference impedance being connected to one terminal of said variable impedance element so the voltage drop across said variable impedance element can be readily compared with the voltage drop across said reference impedance, said reference impedance having an impedance value that is equal to one impedance value of said variable impedance element, said constant current source and said second current source causing current to flow through said variable impedance element and said reference impedance so the voltage drops across said variable impedance element and across said reference impedance will buck each other, said constant current source maintaining the flow of current through said variable impedance element substantially constant irrespective of the value of the current which said second current source causes to flow through said reference impedance.

11. In a control system that can determine changes in impedance of a variable impedance element and that can use such changes to actuate an indicating or controlling device, a circuit which includes said variable impedance element and a current source that maintains a substantially constant current flow through said variable impedance element, a reference impedance, and a second circuit that includes said reference impedance and a second current source that maintains a substantially constant current flow through said reference impedance, said current sources keeping the values of the currents flowing through said variable impedance element and said reference impedance equal, one terminal of said reference impedance being connected to one terminal of said variable impedance element so the voltage drop across said variable impedance element can be readily compared with the voltage drop across said reference impedance, said current sources being magnetic amplifiers.

12. In a control system that can determine changes in impedance of a variable impedance element and that can use such changes to actuate an indicating or controlling device, a circuit which includes said variable impedance element and a constant current source that maintains a substantially constant current flow through said variable impedance element, a reference impedance, and a second circuit that includes said reference impedance and a second constant current source that maintains a substantially constant current flow through said reference impedance, said current sources keeping the values of the currents flowing through said variable impedance element and said reference impedance substantially constant, whereby the voltage across said reference impedance will remain substantially constant but the voltage across said variable impedance element will vary with variations in the impedance of said variable impedance element, one terminal of said reference impedance being connected to one terminal of said variable impedance element so the voltage drop across said variable impedance element can be readily compared with the voltage drop across said reference impedance, said current sources being amplifiers.

13. In a control system than can determine changes in impedance of a variable impedance element and that can use such changes to actuate an indicating or controlling device, a circuit which includes said variable impedance element and a current source that maintains a substantially constant curent flow through said variable impedance element, a reference impedance, and a second circuit that includes said reference impedance and a second current source that maintains a substantially constant current flow through said reference impedance, one terminal of said reference impedance being connected to one terminal of said variable impedance element so the voltage drop across said variable impedance element can be readily compared with the voltage drop across said reference impedance.

14. In a control system that can determine changes in impedance of a variable impedance element and that can use such changes to actuate an indicating or controlling device, a circuit which includes said variable impedance element and a constant current source that maintains a substantially constant current flow through said variable impedance element, a reference impedance and a second circuit that includes said reference impedance and a second constant current source that maintains a substantially constant current flow through said reference impedance, said first circuit providing a constant current through said variable impedance element despite variations in the impedance of said variable element and said second circuit providing a constant current through said reference impedance despite variations in the impedance of said variable impedance element, one terminal of said reference impedance being connected to one terminal of said variable impedance element so the voltage drop across said variable impedance element can be readily compared with the voltage drop across said reference impedance.

15. In a control system that can determine changes in impedance of a variable impedance element and that can use such changes to actuate an indicating or controlling device, a circuit which includes said variable impedance element and a constant current source that maintains a substantially constant current flow through said variable impedance element despite changes in the impedance value of said variable impedance element, a reference impedance, and a second circuit that includes said reference impedance and a second current source, said reference impedance having an impedance value that is intermediate the highest and lowest impedance values of said variable impedance element, the first said circuit and said second circuit being interconnected to enable changes in the impedance value of said variable impedance element to be compared with the impedance value of said reference impedance, said variable impedance element and said referece impedance coacting, respectively, with said constant current source and said second current source to provide an electrical balance between said circuits at a predetermined impedance value of said variable impedance element and to provide an electrical unbalance between said circuits at other impedance values of said variable impedance element, said electrical unbalance being adapted to actuate an indicating or controlling device, said constant current source maintaining the flow of current through said variable impedance element substantially constant irrespective of the value of the current which said second current source causes to flow through said reference impedance.

16. In a control system that can determine changes in impedance of a variable impedance element and that can use such changes to actuate an indicating or controlling device, a circuit which includes said variable impedance element and an amplifier, a reference impedance, and a second circuit that includes said reference impedance and a second amplifier, the first said amplifier feeding back a signal from the first said circuit to maintain a substantially constant current flow through said variable impedance element irrespective of changes in the impedance of said variable impedance element, said second amplifier feeding back a signal from said second circuit to maintain a substantially constant current flow through said reference impedance, one terminal of said reference impedance being connected to one terminal of said variable impedance element so the voltage drop across said variable impedance element can be readily compared with the voltage drop across said reference impedance.

17. In a control system than can determine changes in impedance of a variable impedance element and that can use such changes to actuate an indicating or controlling device, a circuit which includes said variable impedance element and an amplifier, a reference impedance, and a second circuit that includes said reference impedance and a second amplifier, the first said amplifier feeding back a signal from the first said circuit to maintain a substantionally constant current flow through said variable impedance element irrespective of changes in the impedance of said variable impedance element, said second amplifier feeding back a signal from said second circuit to maintain a substantially constant current flow through said reference impedance, one terminal of said reference impedance being connected to one terminal of said variable impedance element so the voltage drop across said variable impedance element can be readily compared with the voltage drop across said reference impedance.

18. In a control system that can determine changes in impedance of a variable impedance element and that can use such changes to actuate an indicating or controlling device, a circuit which includes said variable impedance element and the emitter-collector of one transistor and the emitter-base of a second transistor, a reference impedance, and a second circuit that includes said reference impedance and the emitter-collector of a third transistor and the emitter-base of a fourth transistor, the first said and said third transistors controlling the currents flowing through said variable impedance element and said reference impedance and also controlling the conductivities of said second and fourth transistors, and resistors in the collector circuits of said second and fourth transistors, said second and fourth transistors developing bucking voltage drops across said resistors, the first said transistor holding the value of the current flowing in the first said circuit substantially equal irrespective of changes in the value of the impedance of said variable impedance element, said third transistor responding to changes in the value of the impedance of said variable impedance element to change the value of the current flowing through said reference impedance to maintain the voltage drop across said reference impedance equal to the voltage drop across said variable impedance element.

19. In a control system that can determine changes in impedance of a variable impedance element and that can use such changes to actuate an indicating or controlling device, a circuit which includes said variable impedance element and the emitter-collector of one transistor and the emitter-base of a second transistor, said circuit maintaining the level of current flow through said variable impedance element substantially constant, a reference impedance, and a second circuit that includes said reference impedance and the emitter-collector of a third transistor and the emitter-base of a fourth transistor, said second circuit causing current to flow through said reference impedance, the first said and said third transistors controlling the currents flowing through said variable impedance element and said reference impedance, and also controlling the conductivities of said second and fourth transistors, the first said circuit maintaining a substantially constant flow of current through said variable impedance element irrespective of the value of current which said second circuit causes to flow through said reference impedance, and resistors in the collector circuits of said second and fourth transistors, said second and fourth transistors developing bucking voltage drops across said resistors, one terminal of one of said resistors being connected to one terminal of the other of said resistors so the voltage drop across said one resistor can be readily compared with the voltage drop across said other resistor, the base of said third transistor being connected to said variable impedance element so the conductivity of said third transistor changes as the impedance of said variable impedance element changes, the voltage drops across said resistors having a predetermined relationship to each other whenever the current flowing through said reference impedance equals the current flowing through said variable impedance element and having a different relationship to each other whenever the current flowing through said reference impedance differs from the current flowing through said variable impedance element.

20. In a control system that can determine changes in impedance of a variable impedance element and that can use such changes to actuate an indicating or controlling device, a circuit which includes said variable impedance element and a transistor, said circuit maintaining the level of current flow through said variable impedance element substantially constant, a reference impedance, and a second circuit that includes said reference impedance and a second transistor, said second circuit causing current to flow through said reference impedance, said transistors controlling the values of the currents flowing through said variable impedance element and said reference impedance, said transistors maintaining the currents flowing through said variable impedance element and said reference impedance equal irrespective of changes in the impedance of said variable impedance element, one terminal of said reference impedance being connected to one terminal of said variable impedance element so the voltage drop across said variable impedance element can be readily compared with the voltage drop across said reference impedance.

21. In a control system that can determine changes in impedance of a variable impedance element and that can use such changes to actuate an indicating or controlling device, a circuit which includes said variable impedance element and a transistor, said circuit maintaining the level of current flow through said variable impedance element substantially constant, a reference impedance, and a second circuit that includes said reference impedance and a second transistor, said second circuit maintaining the level of current flow through said reference impedance substantially constant, said transistors controlling the values of the currents flowing through said variable impedance element and said reference impedance, said transistors maintaining the currents flowing through said variable impedance element and said reference impedance equal irrespective of changes in the impedance of said variable impedance element, said variable impedance element and said reference impedance being connected, said substantially constant level of current flow through said reference impedance coacting with the impedance of said reference impedance to develop a substantially constant voltage across said reference impedance, said substantially constant level of current flow through said variable impedance element coacting with variations in the impedance of said variable impedance element to develop variations in the voltage across said variable impedance element, the variations in the voltage across said variable impedance element relative to the substantially constant voltage across said reference impedance actuating said indicating or controlling device.

22. In a control system that can determine changes in impedance of a variable impedance element and that can use such changes to actuate an indicating or controlling device, a circuit which includes said variable impedance element and an amplifier, said amplifier maintaining a substantially constant level of current flowing through said variable impedance element despite changes in the impedance value of said variable impedance element, a reference impedance, and a second circuit that includes said reference impedance and a second amplifier, said second amplifier causing current to flow through said reference impedance, said reference impedance having an impedance value that is equal to one impedance value of said variable impedance element, said amplifiers being controlled by feedback from said circuits, whereby said amplifiers operate as closed-loop amplifiers, the first said amplifier maintaining the flow of current through said variable impedance element substantially constant irrespective of the value of the current which said second amplifier causes to flow through said reference impedance, the substantially constant current flowing through said variable impedance element coacting with variations in the impedance of said variable impedance element to develop different voltages across said variable impedance element, said second circuit being connected to the first said circuit so different voltages across said variable impedance element will vary the current flowing through said reference impedance, the current flowing through said reference impedance bearing a predetermined relationship to the current flowing through said variable impedance element whenever a predetermined voltage is developed across said variable impedance element and bearing a different relationship to the current flowing through said variable impedance element whenever a different voltage is developed across said variable impedance element.

23. In a control system that can determine changes in impedance of a variable impedance element and that can use such changes to actuate an indicating or controlling device, a circuit which includes said variable impedance element and an amplifier, said amplifier maintaining a substantially constant level of current flowing through said variable impedance element despite changes in the impedance value of said variable impedance element, a reference impedance, and a second circuit that includes said reference impedance and a second amplifier, said second amplifier causing current to flow through said reference impedance, said reference impedance having an impedance value that is equal to one impedance value of said variable impedance element, said amplifiers being controlled by feedback from said circuits, whereby said amplifiers operate as closed-loop amplifiers, the first said amplifier maintaining the flow of current through said variable impedance element substantially constant irrespective of the value of the current which said second amplifier causes to flow through said reference impedance, one terminal of said reference impedance being connected to one terminal of said variable impedance element so the voltage drop across said variable impedance element can be readily compared with the voltage drop across said reference impedance.

24. In a control system that can determine changes in impedance of a variable impedance element and that can use such changes to actuate an indicating or controlling device, a circuit which includes said variable impedance element and an amplifier, said amplifier maintaining a substantially constant level of current flowing through said variable impedance element despite changes in the impedance value of said variable impedance element, a reference impedance, and a second circuit that includes said reference impedance and a second amplifier, said second amplifier causing current to flow through said reference impedance, said reference impedance having an impedance value that is equal to one impedance value of said variable impedance element, said amplifiers being controlled by feedback from said circuits, whereby said amplifiers operate as closed-loop amplifiers, said first said amplifier maintaining the current flowing through said variable impedance element substantially constant and said second amplifier maintaining the current flowing through said reference impedance substantially constant, one terminal of said reference impedance being connected to one terminal of said variable impedance element so the voltage drop across said variable impedance element can be readily compared with the voltage drop across said reference impedance.

25. In a control system that can determine changes in impedance of a variable impedance element and that can use such changes to actuate an indicating or controlling device, a circuit which includes said variable impedance element and a constant current source that maintains a substantially constant current flow through said variable impedance element despite changes in the impedance value of said variable impedance element, a reference impedance, and a second circuit that includes said reference impedance and a second constant current source, said reference impedance having an impedance value that is equal to one of the impedance values of said variable impedance element, the voltage drop across said variable impedance element bucking the voltage drop across said reference impedance, said second constant current source coacting with said reference impedance to maintain a substantially constant voltage across said reference impedance, the first said constant current source coacting with variations in the impedance of said variable impedance element to develop different voltages across said variable impedance element, one terminal of said reference impedance being connected to one terminal of said variable impedance element so the voltage drop across said variable impedance element can be readily compared with the voltage drop across said reference impedance.

26. In a control system that can determine changes in impedance of a variable impedance element and that can use such changes to actuate an indicating or controlling device, a circuit which includes said variable impedance element and a constant current source that maintains a substantially constant current flow through said variable impedance element, a reference impedance, and a second circuit that includes said reference impedance and a second constant current source, said second current constant source maintaining a substantially constant current flow through said reference impedance, whereby changes in the value of the impedance of said variable impedance element can provide a voltage drop across said variable impedance element that varies relative to the voltage drop across said reference impedance, one terminal of said reference impedance being connected to one terminal of said variable impedance element so the voltage drop across said variable impedance element can be readily compared with the voltage drop across said reference impedance.

27. In a control system that can determine changes in impedance of a variable impedance element and that can use such changes to actuate an indicating or controlling device, a circuit which includes said variable impedance element and a constant current source that maintains a substantially constant current flow through said variable impedance element despite changes in the impedance value of said variable impedance element, a reference impedance, and a second circuit that includes said reference impedance and a second current source, said second current source being connected to the first said circuit and thereby responding to changes in the value of the impedance of said variable impedance element to change the value of the current flowing through said reference impedance, whereby said control system provides a change in current flow that corresponds to and is proportional to changes in the value of the impedance of said variable impedance element, said change in current flow being adapted to actuate said indicating or controlling device.

28. In a control system, a variable impedance element, a circuit which includes said variable impedance element and a current source that maintains a substantially constant current flow through said variable impedance element, a reference impedance, and a second circuit that includes said reference impedance and a second current source, said reference impedance being a variable impedance, said second current source maintaining a substantially constant current flow through said reference impedance, one end of said variable impedance element being connected to one end of said reference impedance whereby differences between the voltage drops across said variable impedance element and across said reference impedance can produce a difference of voltage.

29. In a control system, a variable impedance element, a circuit which includes said variable impedance element and a constant current source that maintains a substantially constant current flow through said variable impedance element, a reference impedance, and a second circuit that includes said reference impedance and a second current source, said reference impedance being a variable impedance, said second circuit source being connected to the first said circuit so it can respond to variations in the voltage drop across said variable impedance element, said substantially constant current flow through said variable impedance element coacting with variations in the impedance of said variable impedance element to develop variations in the voltage drop across said variable impedance element and said second current source responding to said variations in the voltage drop across said variable impedance element to vary the flow of current through said reference impedance to maintain the voltage drop across said reference impedance substantially equal to the voltage drop across said variable impedance element, the variations in current flow through said reference impedance being a function of the changes in impedance of said variable impedance element and providing variations between the constant current flowing through said variable impedance element and the variable current flowing through said reference impedance, the variations in current flow through said reference impedance also being a function of changes in the impedance of said reference impedance.

30. In a control system, a variable impedance element, a circuit which includes said variable impedance element and a constant current source that maintains a substantially constant current flow through said variable impedance element despite changes in the impedance value of said variable impedance element, a reference impedance, and a second circuit that includes said reference impedance and a second current source, said reference impedance having an impedance value outside the range of impedances of said variable impedance element, said second current source being connected to the first said circuit so it can respond to variations in the voltage drop across said variable impedance element, said second current source responding to variations in the voltage drop across said variable impedance element to vary the flow of current through said reference impedance to maintain the voltage drop across said reference impedance substantially equal to the voltage drop across said variable impedance element, the variations in current flow through said reference impedance being a function of the changes in impedance of said variable impedance element, said constant current source maintaining the flow of current through said variable impedance element substantially constant irrespective of the value of the current which said second current source causes to flow through said reference impedance, the variations in current flow through said reference impedance providing variations between the constant current flowing through said variable impedance element and the variable current flowing through said reference impedance.

31. In a control system, a variable impedance element, a circuit which includes said variable impedance element and a constant current source that maintains a substantially constant current flow through said variable impedance element, a reference impedance, and a second circuit that includes said reference impedance and a second constant current source, said reference impedance having an impedance value outside the range of impedances of said variable impedance element, said second constant current source maintaining a substantially constant current flow through said reference impedance, said constant current sources causing current to flow through said variable impedance element and said reference impedance so that the voltage drops across said variable impedance element and across said reference impedance will buck each other, one terminal of said reference impedance being connected to one terminal of said variable impedance element so the voltage drops across said reference impedance and said variable impedance element can be compared.

32. In a control system, a variable impedance element, a circuit which includes said variable impedance element and a constant current source that maintains a substantially constant current flow through said variable impedance element, a reference impedance, and a second circuit that includes said reference impedance and a second current source, said second current source being connected to the first said circuit so it can respond to the voltage drop across said variable impedance element, said second current source responding to the voltage drop across said variable impedance element to vary the flow of current through said reference impedance to maintain the voltage drop across said reference impedance substantially equal to the voltage drop across said variable impedance element and thereby statically provide a current change that is proportional to changes in the impedance of said variable impedance element.

References Cited by the Examiner

UNITED STATES PATENTS

| 2,613,237 | 10/1952 | Starr | 324—62 X |
| 2,752,429 | 6/1956 | Hanson | 323—89.11 |
| 3,096,650 | 7/1963 | Lowenstein et al. | 323—69 |
| 3,114,872 | 12/1963 | Allard | 323—22 |

FOREIGN PATENTS 338,895   7/1959   Switzerland.

LLOYD McCOLLUM, *Primary Examiner.*

MILTON O. HIRSHFIELD, *Examiner.*